(12) United States Patent
Kirk et al.

(10) Patent No.: US 10,827,667 B2
(45) Date of Patent: Nov. 10, 2020

(54) YIELD MONITOR FOR WINDROW-COLLECTED MATERIAL

(71) Applicant: Clemson University Research Foundation, Clemson, SC (US)

(72) Inventors: Kendall R. Kirk, Aiken, SC (US); H. Guy Ramsey, IV, Sharon, SC (US)

(73) Assignee: Clemson University Research Foundation, Clemson, SC (US)

( * ) Notice: Subject to any disclaimer, the term of this patent is extended or adjusted under 35 U.S.C. 154(b) by 0 days.

(21) Appl. No.: 16/219,335

(22) Filed: Dec. 13, 2018

(65) Prior Publication Data

US 2019/0110389 A1    Apr. 18, 2019

Related U.S. Application Data

(63) Continuation of application No. 15/209,909, filed on Jul. 14, 2016, now Pat. No. 10,188,025.

(51) Int. Cl.
| | |
|---|---|
| *A01B 79/00* | (2006.01) |
| *A01D 89/00* | (2006.01) |
| *A01F 15/08* | (2006.01) |
| *G01G 17/00* | (2006.01) |
| *A01F 15/07* | (2006.01) |
| *G01G 17/02* | (2006.01) |
| *G01B 17/00* | (2006.01) |
| *G01B 11/00* | (2006.01) |

(52) U.S. Cl.
CPC .......... *A01B 79/005* (2013.01); *A01D 89/006* (2013.01); *A01F 15/071* (2013.01); *A01F 15/0825* (2013.01); *A01F 15/0883* (2013.01); *G01G 17/00* (2013.01); *G01G 17/02* (2013.01); *A01F 2015/077* (2013.01); *A01F 2015/0891* (2013.01); *G01B 11/00* (2013.01); *G01B 17/00* (2013.01)

(58) Field of Classification Search
CPC .................................................. A01B 79/005
See application file for complete search history.

(56) References Cited

U.S. PATENT DOCUMENTS

| | | |
|---|---|---|
| 1,469,634 A | 9/1969 | Whiteshides |
| 3,565,178 A | 2/1971 | Whitefield |
| 3,595,078 A | 7/1971 | Beck |

(Continued)

FOREIGN PATENT DOCUMENTS

WO    WO2014197973    12/2014

OTHER PUBLICATIONS

Fravel, et al.; "Development and Testing of an Impact Plate Yield Monitor for Peanuts," 2013 ASABE Annual International Meeting; Paper No. 162969, Jul. 21-24, 2013 (10 pages).

(Continued)

*Primary Examiner* — Manuel A Rivera Vargas
(74) *Attorney, Agent, or Firm* — Kim and Lahey Law Firm, LLC; Douglas W. Kim; Seann P. Lahey

(57) ABSTRACT

Disclosed are methods and systems for determining the amount of material contained in a windrow. In particular embodiments, the methods and systems are applicable to agricultural applications, and in particular to hay yield monitoring. Systems include a remote sensing technology to determine windrow height. Remote sensing methods can include ultrasonic sensors, optical sensors, and the like. Systems can provide real time yield data.

20 Claims, 12 Drawing Sheets

(56) References Cited

U.S. PATENT DOCUMENTS

| | | |
|---|---|---|
| 4,230,188 A | 10/1980 | Paulk |
| 1,280,419 A | 7/1981 | Fischer |
| 1,765,190 A | 8/1988 | Strubbe |
| 4,821,637 A | 4/1989 | Viaud |
| 4,933,589 A | 6/1990 | Strubbe |
| 5,282,389 A | 2/1994 | Faivre et al. |
| 5,343,761 A | 9/1994 | Myers |
| 5,585,626 A | 12/1996 | Beck et al. |
| 5,739,429 A | 4/1998 | Schmitkons et al. |
| 5,887,669 A | 3/1999 | Ostler et al. |
| 6,003,387 A | 12/1999 | Larson et al. |
| 6,073,550 A | 6/2000 | Goossen et al. |
| 6,192,664 B1 | 2/2001 | Missotten et al. |
| 6,223,848 B1 | 5/2001 | Young et al. |
| 6,272,819 B1 | 8/2001 | Wendte et al. |
| 6,431,981 B1 | 8/2002 | Shinners et al. |
| 6,460,008 B1 | 10/2002 | Hardt |
| 6,525,276 B1 | 2/2003 | Vellidus et al. |
| 6,675,561 B2 | 1/2004 | Davis et al. |
| 6,809,821 B2 | 10/2004 | Thomasson et al. |
| 6,820,459 B2 | 11/2004 | Beck et al. |
| 6,988,857 B2 | 1/2006 | Kroemmer et al. |
| 7,249,449 B2 | 7/2007 | Goering et al. |
| 7,743,590 B1 | 6/2010 | Gidden et al. |
| 7,815,001 B2 | 10/2010 | Liljeblad et al. |
| 7,873,456 B2 | 1/2011 | Erdmann et al. |
| 8,504,310 B2 | 8/2013 | Landphair et al. |
| 9,901,031 B2 | 2/2018 | Mott et al. |
| 2007/0039303 A1 | 2/2007 | Mitchel |
| 2013/0317696 A1 | 11/2013 | Koch et al. |
| 2014/0076218 A1 | 3/2014 | Liu |
| 2015/0379785 A1 | 12/2015 | Brown et al. |
| 2016/0081271 A1 | 3/2016 | Mott |
| 2017/0016870 A1* | 1/2017 | McPeek ............ G01N 33/0098 |

OTHER PUBLICATIONS

Free et al.; "Testing of an Impact Plate Yield Monitor for Peanuts, Mounting Configurations and Air Pressure Correction," 2014 ASABE Meeting Presentation, Paper No. 1914021; Jul. 13-16, 2014; (6 pages).

Monfort; Peanut Money-Maker Production Guide—Clemson University—2013, (77 pages).

Omer, et al.; "Comparative Study on Different Peanut Digging Blades," Agric. Mech. Asis. Afr. Lat. Am. (Jun. 2001) 21(3) pp. 43-45.

Penirschke, et al.; "Microwave mass flow meter for pneumatic conveyed particulate solids", Conference Paper—Microwave Flow Meter / Internet www.researchgate.net/publication/224564814_Microwave_mass_flow_meter_for_pneumatic_particulate_solids. Dated Jun. 9, 2015 (2 pages).

Roberson; "Improving Harvesting Efficencies for Peanut Diggers,'" N. C. State University; (downloaded from Web on Aug. 24, 2016); (1 page).

Thomasson, J.A. et al.; "Optical Peanut Yield Monitor Development and Testing," Publications 2006 American Society of Agriculture and Biological Engineers ISSN 0883-8542 (10 pages).

Warner, et al.; "Variable Depth Peanut Digger; Part I—Design and Testing," 2014 ASABE and CSBE/SCGAB Annual International Meeting; Paper No. 1914163, Jul. 13-16, 2014 (7 pages).

Warner, et al.; "Variable Depth Peanut Digger; Part II—Digging Loss Analysis," 2014 ASABE and CSBE/SCGAB Annual International Meeting; Paper No. 1914272, Jul. 13-16, 2014 (7 pages).

* cited by examiner

YIELD MONITOR FOR WINDROW-COLLECTED MATERIAL

CROSS REFERENCE TO RELATED APPLICATION

This application claims filing benefit of U.S. patent application Ser. No. 15/209,909 having a filing date of Jul. 14, 2016 which claims filing benefit of U.S. Provisional Patent Application Ser. No. 62/192,298 having a filing date of Jul. 14, 2015, which are incorporated by reference.

BACKGROUND OF THE INVENTION

As the need for agricultural efficiency and productivity continues to increase producers must find ways to maximize their crop's potential. Economic drivers arise from increases in fertilizer and herbicide cost, and environmental drivers call for improved pesticide and water management. Precision agriculture concepts and methods are showing great promise in meeting the world's needs for efficient agricultural practices and are becoming a staple in most row crop producers' management strategies. For instance, cotton and corn producers are using yield monitors to define and assess different zones of production and are managing these zones with variable rate application of inputs. Application of yield monitoring technologies to the production of cotton and corn has improved crop management and profits as they allow the producer to make real time adjustments to management strategy when the yield goals for zones are not met. Through such strategies, producers are making progress in increasing yield while decreasing cost and field inputs. Additionally, crop yield maps provide producers with documentation of historical yield for use in substantiating insurance claims or other yield loss claims.

Crop yield data is also sometimes used to support land rent values. Hay and forages are an important part of the agricultural infrastructure particularly as livestock feed, which makes up a great deal of agricultural industry worldwide. Unfortunately, hay and forages have seen limited commercial applications of precision agriculture technology. The development of precision agriculture devices and methods that would be applicable to the harvest of windrow crops such as hay and other forage crops could improve crop management and profits in this industry similar to what has been shown for other crops.

One system has been developed in an attempt to produce yield maps from a hay field. This system weighs the bale as it comes out of the baler. Unfortunately, this system is limited to use with a large square baler. In addition, when developing a yield map by use of this system, the hay yield is not accurately distributed across the field as differences in windrow volume across the field are not accounted for. By this system, a consistent volume of hay is assigned to a windrow for a certain bale, substantially reducing map resolution. Another problem with this system is that it does not provide on-the-go yield data for the producer. Exclusive post-processing of data can be problematic in that the actions to be followed to generate the yield map may not be known be the grower and the data may have to be processed to generate the map by a third party.

Another yield monitor technology that has been examined for forage harvesting utilizes feedrollers on a silage chopper (Shinners et al., 2003). On some self-propelled forage harvesters, such as a hay windrower, impact force measure on a hinged plate have been used on the area where hay passes from the rear of the machine, correlating to yield at mowing (Savoie et al., 2002). Another study implemented yield monitoring technology on a self-propelled windrower to obtain yield data using five parameters including impact force at the swath forming shield, crop flow at the swath forming shield, roller speed, platform pitch, and pressure of platform drive motor (Shinners et al., 2003). On a forage harvester for silage, a study was conducted where five sensors were installed including a torquemeter on the PTO shaft and at the cutterhead, a load cell on the duct, a vertical displacement transducer on the feedrollers, and a capacitance-controlled oscillator installed at the end of the duct where the crop exits. Each of these sensor's responses was correlated to wet matter flow rate (Savoie et al., 2002). Feedroller pressure and displacement have been used on self-propelled silage choppers to monitor yield (Digman and Shinners, 2012). Some hay baler manufacturers have systems that can be implemented on the baler to weigh the bales after they are baled. This method utilizes load cells on the axle and the tongue of the baler.

While the above illustrate improvement in the art, room for further improvement exists. For instance, systems and methods for hay and forage yield monitoring that use remote sensing technology and capable of use with a wide variety of farm implements would be of great benefit. A need exists for yield monitoring technology devices and methods that can be used to improve management capabilities in windrow-collected crops such as hay.

SUMMARY OF THE INVENTION

In accordance with one embodiment of the present disclosure, a monitoring system for a windrow collected material is disclosed. A system can include a first sensor that can be configured to sense data with regard to the cross sectional area of a windrow. For instance, the first sensor can detect the height and optionally also a width of the windrow or any other geometric dimension that can be used to determine a cross sectional area and thereby a volume for the windrow. The system can also include a second sensor that can be configured to detect a length of the windrow. Alternatively, a global positioning system (GPS) can be incorporated to relate the length of the windrow. The system can also include a processor that can be configured to process the data from the first and second sensors to determine an amount of a material contained in the volume. For instance, the system can determine the amount of a crop, e.g., a hay or forage crop, contained in the windrow.

Also disclosed is a method for determining the amount of material in a windrow. The method can include ascertaining by use of a first sensor data regarding a cross sectional area of a windrow (e.g., the windrow height), ascertaining by use of a second sensor data regarding a length of the windrow, processing the data from the first and second sensors to determine the amount of the material (e.g., a crop) contained in the windrow.

Beneficially, the systems and methods can provide on-the-go data as well as long-term data to users. For example, the systems and methods can be utilized in conjunction with a suitable farm implement (e.g., a baler) to develop crop yield maps and to obtain other useful information for part of a field or for an entire field in both real time and over multiple growing seasons. Moreover, systems can easily be provided on an implement by original equipment manufacturers (OEM) or as an aftermarket retrofit.

The windrow collecting implement having an operating width representing a distance between adjacent windrows; and include a first sensor carried by the windrow collecting implement and configured to detect a height of a windrow along a travel path at detection points, the windrow disposed below the windrow collecting implement and the first sensor disposed above the windrow; a second sensor carried by the windrow collecting implement and that is configured to detect a distance traveled by the windrow collecting implement; and, a processor that is configured to process the data height of the windrow from the first sensor, a length traveled by the windrow collecting implement from the second sensor, and the operating width to determine a amount volume of a material contained in the windrow, configured to process the volume of a material contained in the windrow to determine a yield map. The material can be agricultural crop including tree nuts. The system can include a third sensor configured to detect a width of the windrow and an additional sensor configured to detect a cross-sectional dimension of a windrow. The first sensor can be an ultrasonic sensor. The processor can be configured to process a location data and the yield map to determine a yield per unit acre. The system can include a GPS carried by the windrow collecting implement providing location data of the windrow collecting implement. The processor can be is configured to process the location data provided by the GPS and the yield map to determine a yield per unit acre. The windrow collecting implement is a combine or baler.

Other features and aspects of the present disclosure are set forth in greater detail below.

BRIEF DESCRIPTION OF THE DRAWINGS

A full and enabling disclosure of the subject matter, including the best mode thereof, directed to one of ordinary skill in the art, is set forth more particularly in the remainder of the specification, which refers to the appended figures in which.

DETAILED DESCRIPTION

Figure 1:
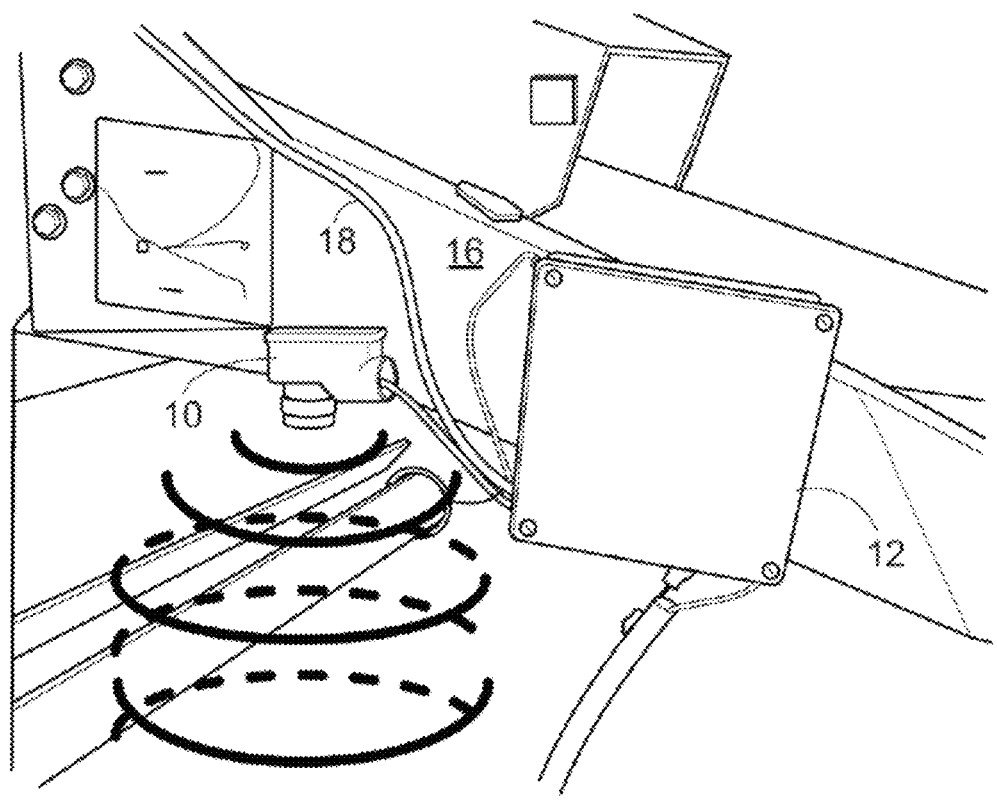
FIG. 1 illustrates one embodiment of an ultrasonic sensor mounting for determining windrow height as may be incorporated in a system as described.

It is to be understood that the terminology used herein is for the purpose of describing particular embodiments only and is not intended to limit the scope of the present invention. The present discussion is a description of exemplary embodiments only and is not intended as limiting the broader aspects of the present invention.

Generally, the present disclosure is directed to monitoring systems and methods that can provide information with regard to the amount of material contained in a windrow. In particular embodiments, the systems and methods are directed to monitoring yield of crops that are collected into windrows for harvesting, but the disclosure is not limited to this embodiment. As utilized herein, the term "windrow" generally refers to a row of any gathered material. While the majority of this disclosure is directed to agricultural windrows that are a row of harvested (e.g., cut, mowed, dug, thrashed, sweeped, shaked, or picked) forages, nuts, root crops, tuber crops, fruits, legumes, or small grains (e.g., hay, straw, edible beans, potatoes, sweet potatoes, almonds, hazelnuts, walnuts, pecans, cashews, chestnuts, figs, macadamia nuts, tung nuts, onions, garlic, turnips, beets, radishes, or citrus fruits), the systems and methods can also be utilized in conjunction with a gathered row of another material such as snow or earth. Beneficially, the advancements in real time windrow mass sensing and yield monitoring, and the precision control technologies available through use of the disclosed systems and methods, can allow for improved management capabilities, increased profitability, reduced environmental impacts, and reduced input costs for windrow collected materials, and in particular for agricultural applications.

While any windrow gathered crop can be monitored by the system, it can be particularly beneficial in harvesting of hay, which can include any grass, or mixture of grasses, as are generally known in the art including, without limitation, ryegrass, timothy, brome, fescue, Bermudagrass, orchard grass, switchgrass, bahiagrass, big bluestem, little bluestem, indiangrass, gamagrass, pearl millet, reed canary grass, Teff, wheatgrass, blue grama, and meadowgrass. A hay may also or alternately include legumes, such as alfalfa (lucerne), clovers (red, white and subterranean), Trefoil, perennial peanut, lespedeza, vetch, soybean, and cowpeas. Hays are also sometimes made from small grains including but not limited to rye, oat, wheat, triticale, barley, and canola. Other pasture forbs can be included in a hay mix, as is known.

Disclosed systems can also be utilized in monitoring the amount of crop by-products, e.g., small grain straw, pine straw, and peanut hay contained in a windrow.

Windrows as may be monitored can be formed in straight lines extending from one end of a field to another or they may be curved depending upon the size, shape and contours of the land where the crop is located. The distance between adjacent windrows is generally a function of the windrow producing implement that is used to make the windrows. Currently, windrow producing implements have an operating width so that the center to center distance between adjacent windrows is generally from about 14 feet to about 18 feet. The yield monitoring systems can efficiently operate at these spacing distances but can also be scaled to accommodate windrow spacing that is smaller than 14 feet or larger than 18 feet.

The disclosed systems utilize data obtained from a combination of sensors to measure windrow volume. Using this information, an amount of material (e.g., crop mass) can be predicted as a function of the windrow location and/or volume. The data can be accumulated and processed on-the-go, and optionally combined with information from other monitors, e.g., a weighing mechanism, moisture content monitors, etc., to create yield maps that can be used for management and production decisions.

The yield monitoring system can be quite accurate, for instance exhibiting an error rate with regard to actual crop harvest of about 15% or less, or about 10% or less, for instance from about 3% to about 15% in some embodiments.

The yield monitoring system can include a sensor that can operate via remote sensing technology to determine the cross-sectional area of a windrow. More specifically, at least the height of a windrow can be determined by use of one or more remote sensors. Optionally, a width, or any other cross-sectional dimension of a windrow can also be determined by one or more remote sensors. When a windrow width is also determined, a width can be determined by use of the same or different sensors than is utilized to determine the height of the windrow. The height data, optionally combined with sensed width data or with estimated width data based on the characteristics of the windrow-producing implement, is then provided to a processor to determine a cross sectional area of the windrow.

The arrangement of the height sensor(s) is such that a clear view is provided from the sensor to the windrow. By way of example, FIG. 1 illustrates a typical mounting for a sensor 10. The sensor 10 is mounted such that it can send and receive signals to/from the windrow without interference from other surrounding components and without interfering with operation of the implement on which the sensor 10 is mounted. In this particular embodiment, the sensor is located on the tongue 16 of a baler. However, the sensor 10 can be located in conjunction with any portion of an implement, self-propelled machine, or other mobile platform provided that it can obtain the desired windrow height data.

A sensor 10 can utilize any sensing technology as is known to determine the windrow height. By way of example, in the embodiment illustrated in FIG. 1, the sensor 10 is an ultrasonic sensor. Ultrasonic proximity or distance measuring devices have been used for some time and are generally known in the art. In ultrasonic distance measuring, ultrasonic signals are emitted from a transducer and the reflected echoes or return signals from objects in the path of the ultrasonic pulse are detected after a time interval by the transducer. The elapsed time between the transmission of the pulse and the receiving of a return pulse reflected off of an object (i.e. an echo) can then be used to calculate the distance to the objects causing each reflected return.

An ultrasonic sensor 10 can include an ultrasonic transducer operable to transmit and receive ultrasonic sound waves, connected to a pulse generator that generates the ultrasonic pulse from a source voltage supplied from an electrical system. The ultrasonic transducer is connected to a receiving and amplifying circuit that converts ultrasonic sound waves received at the transducer into electrical signals. The system also includes a controller 12 in communication with each of the elements within the sensor 10 and configured to control various aspects of the operation of the ultrasonic sensor 10. In one embodiment, the controller 12 can be a microprocessor or CPU type device able to execute programmed instructions and that can incorporate internal memory for data storage or can be connected to an external memory device for data storage.

The controller 12 can be connected to an input/output unit (not shown), for instance on a tractor. The connections between the sensor 10, controller 12 and the input/output unit may be by wired (as shown in FIG. 1 at 18) or wireless. For instance, in one embodiment, the ultrasonic sensor 10 and also the controller 12 can be connected to a CAN (Controller Area Network) bus of a tractor using appropriate connections and thus communication between the sensor 10, the controller 12 and the input/output unit can be enabled.

In some embodiments, a system can include multiple remote sensors that contribute to the determination of the windrow height. For instance, a system can include multiple ultrasonic sensors. In such embodiments, a system can include a single controller for all of the sensors or separate controllers for each sensor. In addition, the controllers and sensors can be unitary or separated components, as is known in the art.

The radiation pattern of pulses from an ultrasonic transducer typically takes the form of an expanding cone centered on the transducer, the pulse spreading out in the radial direction as it moves away from the transducer along the transmission axis, as illustrated by the solid expansion lines in FIG. 1. The sensor 10 operates in a "transmit and receive cycle" whereby the control circuit within the sensor 10 first triggers the ultrasonic pulse generator to the transducer to produce an ultrasonic pulse. Once the transducer has transmitted its ultrasonic pulse, the control circuit begins the "receive" part of the "transmit and receive cycle". This opens a receive window which defines a period of time during which echoes of the transmitted pulse (illustrated by the dashed lines of FIG. 1) are expected to be received by the transducer and passed to the receiving and amplifying circuit. In one embodiment, the control circuit may introduce a delay of approximately 1 millisecond after the ultrasonic pulse has been transmitted before measuring the received signal to allow any voltage spikes to subside that may be present at the transducer and caused by generating and transmitting the ultrasonic pulse.

A remote sensor is not limited to ultrasonic type proximity sensors, and other remote distance sensors as are known in the art can be utilized. For instance, in one embodiment, an optical sensor can be used. An optical sensor can generally function in a similar fashion as an ultrasonic sensor by sending out a signal (e.g., an infrared signal), and detecting an echo of the emission.

An optical sensor can utilize signals in the visible, IR, or UV range to generate information indicative of a distance to the windrow from the emitter and in some embodiments can also generate information indicative of a spectral reflectance characteristic of the target. The signals can be incoherent or coherent light (e.g., laser). The information indicative of the spectral reflectance characteristic can be used to determine whether the target hit by the light emission is the windrow, a living plant or another object such as soil. Light emitted from the optical sensor for reflection off of the windrow can optionally be modulated so that reflected light from the optical sensor can be discriminated from reflected ambient sunlight.

Figure 2:
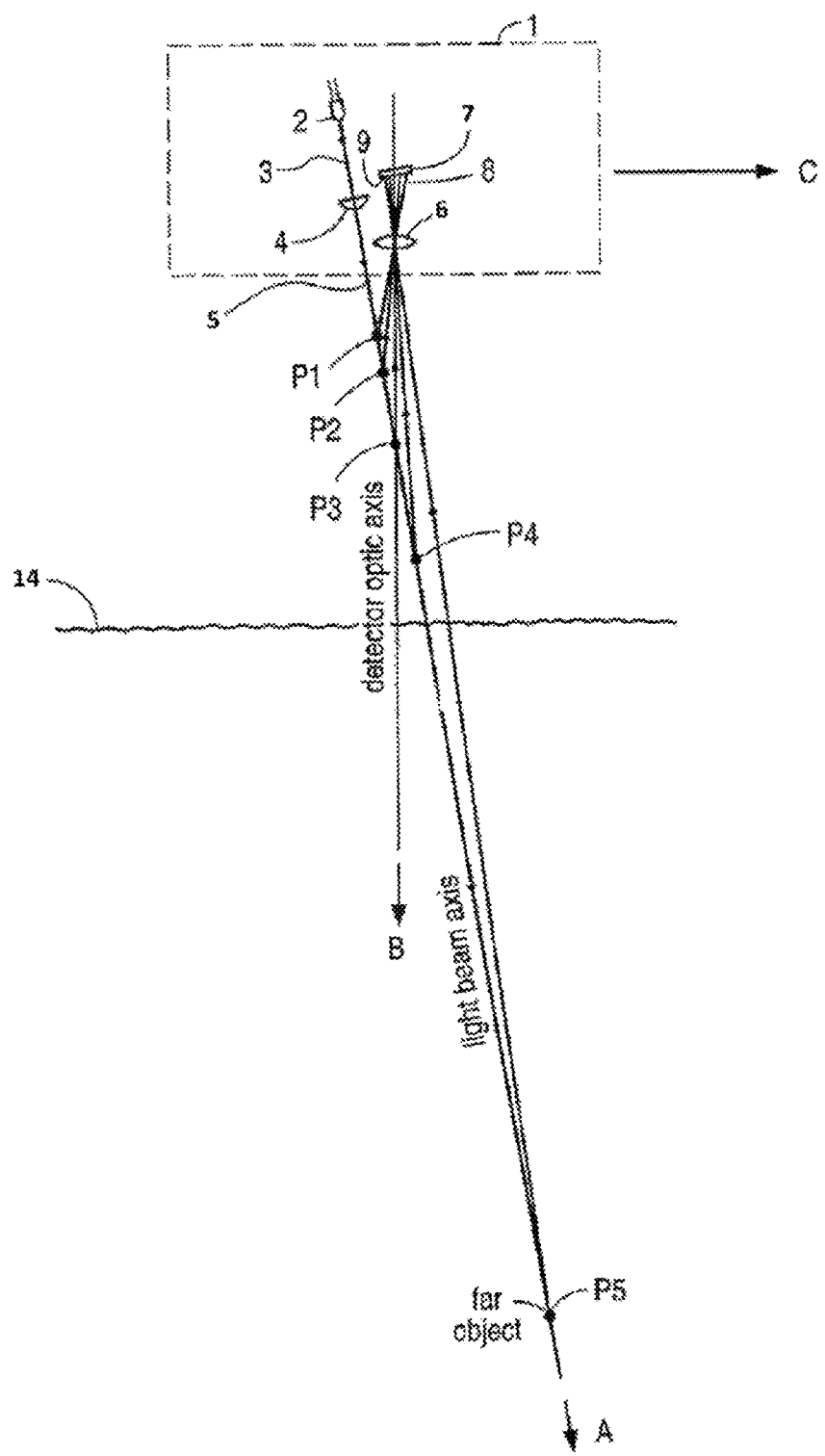
FIG. 2 illustrates one embodiment of an optical sensor as may be incorporated in a system as described.

By way of example, U.S. Pat. No. 5,585,626 to Beck, et al. describes one embodiment of an optical distance sensor as can be utilized in a system. Briefly, and with reference to FIG. 2, an optical sensor 1 can include a source of light 2 that generates light 3, a light beam forming lens 4 which forms light 3 into a light beam 5, a detector lens 6, and a light detector 7. Light beam 5 is aligned in direction A. Detector lens 6 has an optic axis in direction B. If, for example, light from light beam 5 reflects off an object located at point P1, then reflected light from the light beam will be incident on light detector 7 at a near image position 8. If, on the other hand, light from light beam 5 reflects off an object located at a distant point P5, then reflected light from the light beam 5 will be incident on the light detector 7 at a far image position 9. Reflections of light from light beam 5 at several intermediate positions P2-P4 are also illustrated in FIG. 2. Sensor 1 may, for example, be moved in direction C with respect to the surface 14 of the ground in an open field so that light beam 5 is scanned over surface 14.

In one specific embodiment of FIG. 2, the light of light beam 5 can be generated by a plurality of light emitting diodes arranged in a row or array, sometimes referred to as 3D optical sensors. Only one of the light emitting diodes 2 is illustrated in FIG. 2 because the row of light emitting diodes extends in the direction perpendicular to the plane illustrated. Light beam forming lens 4 can be a cylindrical lens that has a longitudinal axis that extends in the direction of the row of light emitting diodes. Light beam 5 therefore can be a relatively thin sheet of light having a first dimension which extends in the direction perpendicular to the illustrated plane and having a second dimension, the direction of travel of the light, which extends in direction A.

In some embodiments, light detector 7 can be a photodiode. Other suitable photodetectors may be used. In some embodiments, a charge coupled device (CCD) may be used. In some embodiments, lens 4 can be a cylindrical lens.

In some embodiments, detector lens 6 can be a plano-convex lens. Of course, the disclosed systems are not limited to optical or ultrasonic proximity sensors, and any suitable distance sensor as may be utilized to remotely determine the height of a windrow is encompassed herein. As an additional example, displacement measurement (e.g., by use of a rotary or linear potentiometer or transducer) of a linkage in mechanical communication between the windrow and mobile sensing platform (e.g., harvester) could be used to sense the size or height of the windrow. Likewise, digital imaging techniques such as edge detection, color analysis, and focal distance could be used to relate the size of the windrow.

Figure 3:
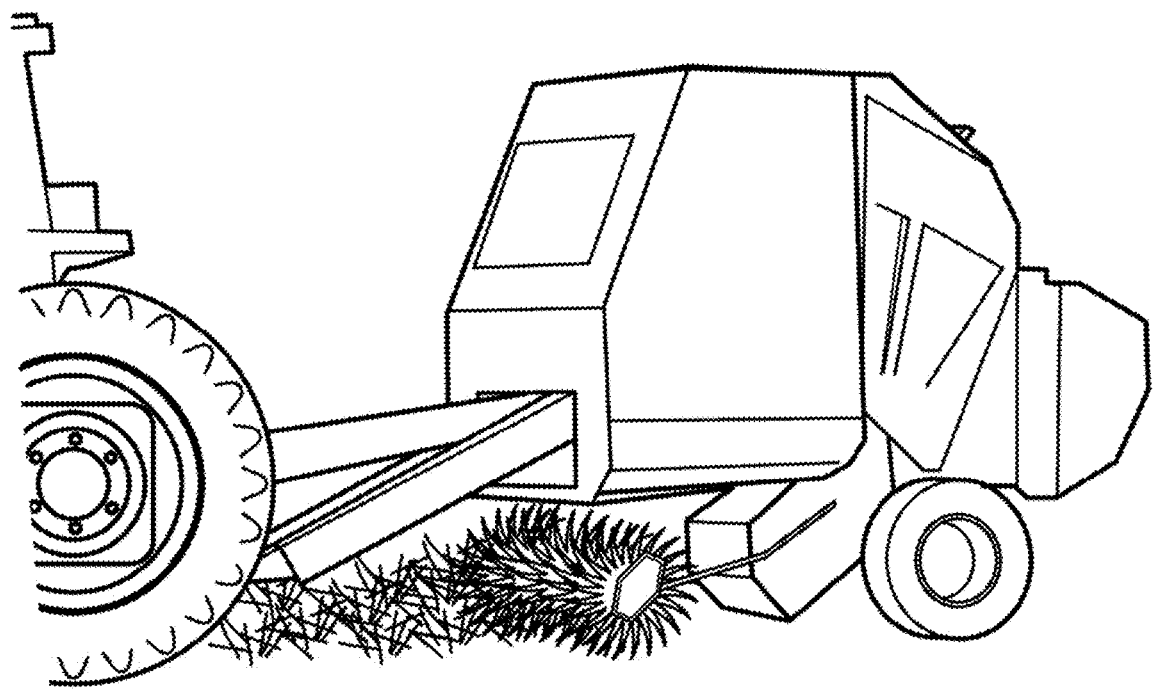
FIG. 3 illustrates a baler as may incorporate a system as disclosed herein.
Figure 4:
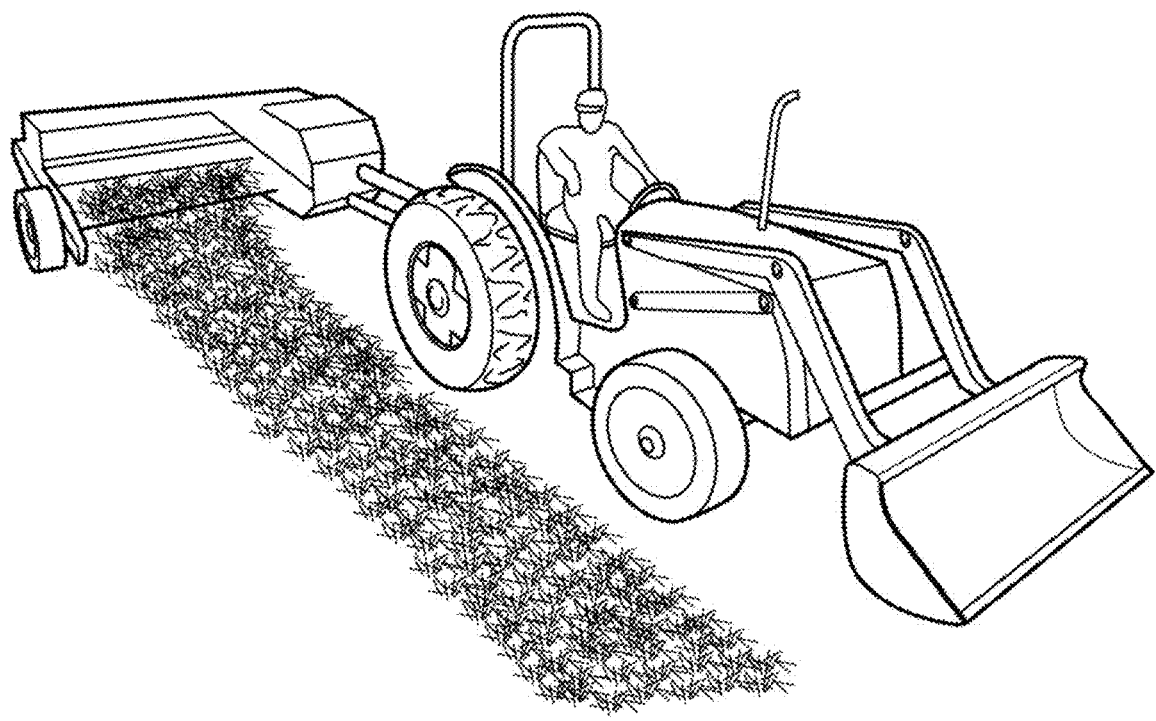
FIG. 4 illustrates another baler as may incorporate a system as disclosed herein.

Referring again to FIG. 1, the sensor 10 can be mounted on any suitable farm implement in order to determine the cross-sectional area of a windrow. For instance, while a system can be incorporated with a hay rake, crop sweeper, or other windrowing machine, it can generally be more accurate if it is incorporated with a farm implement that picks up the crop in the windrow, optionally following a drying period, e.g., a baler, combine, or other windrow pick-up device. For example, the system can be utilized in conjunction with a baler in one embodiment. A baler can be any baler as is generally known in the art, including, without limitation, round balers, small square balers, and large square balers. Examples of balers as may incorporate a system are illustrated in FIG. 3 and FIG. 4. Beneficially, a system can be easily installed in existing machines, is universally pertinent to all windrow pick-up devices, and the system can be low maintenance and provide long-term use. This can allow for retrofit packages of the windrow measurement or yield monitoring system that can be easily adapted to and maintained on implements, e.g., balers and combines.

In addition to a sensor to determine the cross-sectional area of the windrow, the system can also include a sensor to determine a length of the windrow. In one embodiment, the sensor that determines the length of the windrow can simply measure the time spent traveling from one point to another along the windrow and this information can be combined with the speed of travel (e.g., by GPS or radar) in order to determine the distance traveled.

Figure 5:
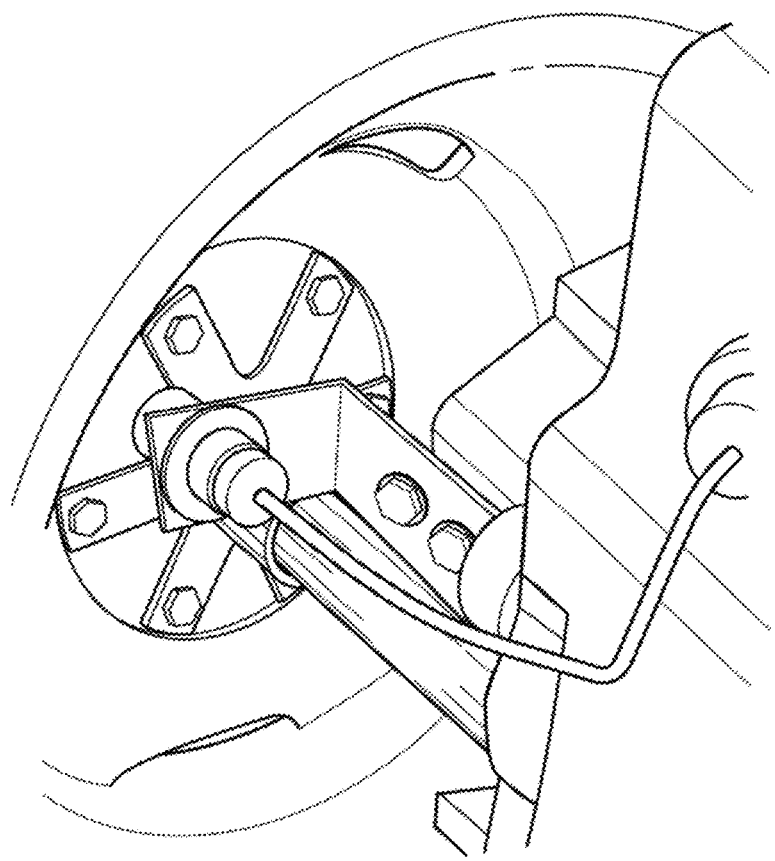
FIG. 5 illustrates one embodiment of a sensor for determining windrow length as may be incorporated in a system as described.

In one embodiment, the length of the windrow can be determined by use of a capacitance sensor or mechanical switch that can be mounted on a wheel of the implement. For instance, a capacitance sensor can be mounted on the hub of a baler as illustrated in FIG. 5. This sensor can then assess the distance travelled by the implement. For example, a capacitance sensor mounted on a hub can sense when each of the wheel studs passes by, signaling for a sensor reading to be logged. Beneficially, by use of such a distance sensor, when the implement is not in motion, no readings will be taken.

A GPS can also be used in some embodiments to determine the length of the windrow. Such a system can be configured to communicate with the processor and provide data with regard to the length of a windrow in conjunction with data obtained from the proximity sensor(s) concerning the height of the windrow.

The sensor utilized to determine length traveled by the farm implement can be provided to a processor to be analyzed in conjunction with the windrow height data provided by the proximity sensor(s). In one embodiment, the two types of sensors can also be in communication with each other. For instance, a controller can be configured such that the windrow height (and the windrow cross sectional area) is obtained at regular intervals as determined by the distance traveled by the farm implement. For instance, a capacitance-based sensor can be utilized to detect travel by the farm implement every 5, 10, 15, 20, etc. feet. At each detection point, the proximity sensor can be triggered to detect the windrow height at that point.

By obtaining windrow height data at one or multiple points along a length of a windrow by use of the proximity sensor(s) and through correlation of that data with the distance travelled along that length, volume of hay that had been passed through the baler could be calculated. A processing system can combine the volume data thus obtained with additional information such as the typical crop density to determine a crop yield. Additional information that can contribute to obtaining a crop yield determination having increased accuracy can include wide ranges of any or all of the following within or across fields: the particular type of crop being harvested, moisture contents and therefore as-harvested crop densities, temperature information and contribution of temperature to crop density, foreign material (FM) type and quantity, and geometry of individual crop pieces.

The complexities and potential variables of yield monitoring may encourage the use of additional types of sensors to obtain improved accuracy in predictions. By way of example, in one embodiment, a system can include a moisture sensor. Analysis of field data has suggested that crop moisture content, and in particular hay moisture content, can have a large effect on crop yield values. Thus, in one embodiment, a system can include one or more sensors for estimating the moisture content of the crop in the windrow. A moisture sensor can be included in a system either near or at the location of the proximity sensor, e.g., at the pick-up point of a windrow collection device, or downstream of the pick-up point, e.g., at or following bale formation.

Moisture sensors as may be incorporated in a system can include, without limitation, capacitive sensors, resistive sensors, microwave transmittance sensors, microwave reflectance sensors, relative humidity sensors, infrared light absorption sensors, and so forth.

In one embodiment, a system can include a capacitive moisture sensor. A capacitance sensing type of moisture detector works upon the premise that variation in the humidity of a given area can be detected through detection of the related variation in the electrostatic capacitance between a pair of electrodes. Measurement of moisture in capacitance-based sensors utilizes the fact that the capacitance of a given sensor depends on the dielectric constant of the crop in the sensor. Since the dielectric constant for the crop (e.g., hay) is much lower than the dielectric constant for water, a small change in the amount of moisture in the crop causes a relatively large change in its dielectric constant. This change in dielectric constant with moisture content makes it ideal for use in measuring moisture content.

In one embodiment, moisture can be accounted for in the windrow collected crop by use of a star wheel capacitive-type moisture sensor as described in U.S. Pat. No. 6,377,058 to Pemrick, which is incorporated by reference herein. For instance, a system can include a star wheel type moisture sensor in the bale chute of a baler. A star wheel moisture sensor is a capacitance sensing type of detector that can locate electrode surfaces within a bale and then measure the resistivity or conductivity between the electrodes that can then be scaled to moisture content of the bale.

A star wheel device can include two star-shaped wheels. Each of these star-shaped wheels has a plurality of points and each of the star-shaped wheels is mounted on the hay baler such that points of the star-shaped wheels rotatably protrude into hay being baled by and progressing through the baler. In the case of rectangular block bales, the points preferably penetrate between parallel stems of the hay compressed into the bale form and are driven to rotate by the moving hay. The star-shaped wheels have a non-conductive arrangement electrically isolating the two star-shaped wheels from each other and from the metal framing of the baler on which they are mounted. Additionally, the device can include means to transmit direct current voltage to one of the two star-shaped wheels and means to transmit direct current voltage reaching the other of the two star-shaped wheels through hay being baled by and progressing through the baler. These transmission means can be insulated wires but might alternatively include printed circuitry. The transmitted current is sent to a readout box. The box includes electrical circuitry to scale the voltage returning through the second wheel into a moisture reading. The readout box then can display the moisture reading. The reading can also be used to control other processes or provide alternative signals, such as sound or visual signals, such as a flashing light.

Other capacitance-type moisture sensors as may be incorporated in a system can include, without limitation, flat plate sensors, parallel plate sensors, and resistance-based moisture sensors. Examples of such sensors have been described, for instance in U.S. Pat. No. 6,249,130 to Greer, U.S. Pat. No. 6,917,206 to Rains, et al., U.S. Pat. No. 5,847,568 to Stashkiw, et al., and U.S. Patent Application Publication No. 2013/0319263 to Roberts, et al., all of which are incorporated herein by reference.

During use of the system, data obtained from the sensors can be processed to provide data concerning the total volume, weight, or combination thereof of crop contained in the windrows. These data can then be manipulated according to any of a variety of mathematical methods as would be possible to those skilled in the art. For example, through processing and manipulation of the data according to standard practice, a hay yield map can be developed having an acceptable level of accuracy for guidance in making variable rate prescriptions and zone management applications across a variety of hay crops.

In addition to the sensors and processing equipment, a system can include communication modules, control overrides, manual data entry ports, data output devices, and so forth as are generally known in the art. For instance, a system can include or be in wired or wireless communication with a graphic user interface located within a tractor for use with a baler in order that an operator can follow the yield information provided by the system. For example, a system can include communications systems and processing software as is known in the art so as to be in communication with a GPS that can provide information to the control system concerning location of the bales as ejected from the baler.

The system, particularly when paired with GPS, can be used in one embodiment to develop yield maps of fields showing the yield per unit acre. Such yield maps can provide information concerning where high yields and low yields are throughout one or more fields. By use of the data, management practices can be developed and modified to improve production efficiency of a farm. Data can also be processed, for instance through conversion of a yield map, to provide profit maps, cost maps, revenue maps, etc., that can provide information to a grower as to particular areas of a farm or field that are the most costly or the most profitable. Yield maps can also be used to quantify nutrient removal at harvest, which knowledge could be used to make subsequent nutrient replacement rate prescriptions.

By implementing the yield monitoring technology and having the ability to generate on-the-go yield data as well as maintain historic yield maps, a producer can have the capability of knowing a full range of yield data, e.g., tons per acre or bales per acre. This knowledge can allow the producer to investigate and remedy both short- and long-term yield limiting factors in low yielding areas. Similarly, the information can provide a route to specifically manage field areas through, for instance, variable rate application of fertilizers proportionate to expected yields. Another example of a management practice that can be implemented through utilization of disclosed systems and methods is the ability to quickly determine areas that are not at all profitable. If money is being lost on certain parts of fields, then those parts can be removed from production entirely so as to increase overall profitability. The crop yield data collected though the disclosed systems and methods could also be used to validate yield loss or yield potential claims, such as those related to insurance, litigation, and land rent.

The present invention may be better understood by reference to the following examples.

Example 1

A boom was constructed from 2.5 cm (1 in.) square tubing and mounted to the tongue of a John Deere 458 hay baler.

The boom was mounted to the bottom of the tongue so the tongue would not interfere with the sensors mounted to the boom.

On the boom, eight pieces of 5 cm×5 cm (2 in.×2 in.) angle iron were mounted in order to provide the sensors with a mounting point. Eight 3521_0 infrared distance sensors (Phidgets Inc., Calgary, Alberta, Canada) were mounted to the angle iron. Each of the sensors was equally spaced along the 99 cm (39 in.) boom. Four Model 1128_0 ultrasonic sensors (Phidgets Inc., Calgary, Alberta, Canada) were secured to every other of piece of the angle iron.

A model LJC18A3 B Z/AX capacitance-based proximity switch was mounted at the hub of the baler. This switch sensed each of the wheel studs as they passed by, signaling for a sensor reading to be logged.

The ultrasonic and infrared distance sensors that were mounted to the boom were connected to USB interface kits or I/O Boards. For the infrared distance sensors, model 1101_0 infrared distance adapters (Phidgets Inc., Calgary, Alberta, Canada) were connected between the sensors and the input/output (I/O) board. Each I/O board had eight analog input channels and twelve were needed, so two I/O boards were utilized. The first I/O board, which was a model 1019_0 (Phidgets Inc., Calgary, Alberta, Canada) required an external 12 VDC power input to support its USB hub. In order to establish a stable power supply, a power inverter was used along with a 12 VDC transformer to power the I/O board. The wiring harnesses supplied with the infrared distance sensors were extended to go between the sensors and the distance adapters. From the adapters to the I/O board, the wiring harnesses supplied with the adapters were used. Phidgets analog input cables were soldered to the boards of the ultrasonic sensors and connected to the other I/O board, which was a model 1018_2 interface kit (Phidgets Inc., Calgary, Alberta, Canada). The ultrasonic sensor harnesses included an additional conductor, each connected to a digital output channel of the I/O board. This digital output was used to pulse the sensors in sequence, so they would not get echo or interference from one another.

The capacitance switch was connected to a digital input channel of the I/O board and a 4.7 kΩ resistor was connected between ground and the digital input. The I/O boards and distance adapters were mounted in sealed PVC electrical enclosure boxes. A model 1040_0 GPS receiver (Phidgets Inc., Calgary, Alberta, Canada) was used to indicate log field position for map development, but its accuracy was not suitable for use in determining ground speeds and short distances. The 1018_2 interface kit and GPS unit were connected to the USB hub of the 1019_0 interface kit. The enclosures containing the data acquisition components for the yield monitoring system were mounted to the baler. The only wires entering the tractor cab were USB cable from the 1019_0 interface kit and the 12 VDC power supply cable from the power inverter. The data acquisition software was written using Microsoft Visual Basic 2010 and data from all sensors was logged on a Panasonic CF-74 Toughook in the tractor cab at each distance trigger event from the capacitance sensor. A separate log file was generated for each bale.

Calibration equations were constructed for each sensor as follows: the baler was put into a stationary position on a flat surface. The height of each infrared sensor was determined to be the same in relation to the flat surface so a reference point at one of the sensors was chosen to use in the calibration process. The height of the reference point was determined, and a plywood panel was extending beyond the length of the boom was placed under the sensors. Readings were taken at different incremental elevations of the plywood panel, the distance to the panel being measured from the aforementioned reference point. The distance measurements were regressed in Microsoft Excel as functions of the sensor readings to develop a distance to target equation for each sensor to be used in the data acquisition software. The same process was carried out for calibration of the ultrasonic sensors.

All baling was carried out at Clemson University Edisto Research and Education Center in Blackville, S.C. Hay was mowed first and after curing and drying was completed, it was raked with a V-style Bush Hog Wheel Rake. The wheel rake provided a standard distance between windrows which could then be used to distribute data back across the field. The average distance between raked windrows was 4.6 m (15 ft). Prior to baling, a baseline was calibrated for the baler, which set the distance from the sensors to the sensed ground level as a target height of zero. To calibrate the baseline, the baler was driven over 5 lineal meters (15 lineal feet) of ground that had been mowed and raked to account for and eliminate the height of the cut crop from sensor response, which may otherwise suggest shallow windrow presence. The calibration process was carried out in each different field prior to baling.

When the baler started to pick up hay for each bale, a "Start Logging" button on the program was clicked and at the end of a bale, when it was being wrapped or tied, a "Stop Logging" button was clicked to advance the bale count, which was incorporated into the file naming convention for the log file. Each bale was tagged with the corresponding file number so that their weights and moisture contents could be later associated with the logged sensor data. The distance traveled to complete each bale varied with the volume of the windrow. In lower yielding areas of the field, the distance travelled was higher than in higher yielding areas of the field. The capacitance switch at the wheel of the baler triggered a sensor reading to indicate height of the windrow beneath each sensor at each 41 cm (16 in.) travel distance.

After the hay was baled, each bale was picked up with a front end loader-mounted bale spear and transported to a scale pad for obtaining and recording weights. The bales were then sampled for moisture content using a Colorado Hay Probe (Nasco, Fort Atkinson, Wis.) coupled to an electric drill. Two cores were removed from each bale and placed into a bag labeled with the corresponding file number. After all moisture samples were collected, the samples were weighed using a model 8800SS scale (Seedburo Equipment Co., Des Plaines, Ill.) and the wet weight was recorded. The samples were then oven-dried for 24 hours at 100° C. (Undersander et al., 1993). After removing samples from the oven, they were once again weighed to obtain dry weight. Moisture content was then calculated on a wet weight basis using the formula: (wet weight—dry weight)/wet weight.

Analysis of the data was conducted in Microsoft Excel and involved correlating the sensor responses to hay mass and mass flow for both dry and wet bases. Analysis of nonlinearity was conducted by applying different mathematical transformations to the sensor responses. Investigation of nonlinearity in the mass and mass flow relationships with sensor response through application of transformations was conducted in order to suggest the most accurate model structure for the yield prediction algorithm.

Linear regression models were developed for prediction of yield across each bale using average sensed windrow height to predict hay mass flow rate and using sum of sensed windrow height to predict total mass. Mass flow models were constructed with non-zero y-intercepts and mass models were constructed through the origin with y-intercepts equal to zero because of the inability to distribute the y-intercept across the point data without on-the-go knowledge of the number of points for each plot. There were instances in the point data where a given sensor response indicated a negative windrow height. These negative windrow height values were converted to zeros and blanks, providing an analysis of which method provided the least yield prediction error.

In addition to modeling as a function of windrow height (Ht), each of these general model types (mass flow and mass predictions) were constructed across the following mathematical transformations of the sensed windrow heights to correct for potential non-linearity: Ht0.5, Ht2, Ln(Ht), Exp (Ht), Ht0.25, and Ht4. The mathematical transformations were applied to the point data for each sensor, prior to averaging or summing across entire point data from each plot. As discussed, the point data was that which was generated at each capacitance switch trigger event. Single linear regression models as functions of windrow height and the transformations were developed as well as multiple linear regression models, with the first regressor being windrow height or one of its transformations and the second regressor being moisture content.

The infrared distance sensors exhibited several problems from the very beginning. The data that they produced was erratic and not proportional to target distance; negative windrow volumes were regularly recorded for these sensors. This error could be attributed to many reasons, with none being specifically identified in this study. It is suspected that the most likely cause for inaccurate readings was from the high amount of dust produced from the header of the baler taking in the hay. The dust may have clouded the sensors almost immediately. Also, the sensors could have been affected by exterior heat at the sensor or at the sensed target, or the surface geometry of the target (windrow) could have resulted in an inability to obtain a sensor response proportional to distance. It is suspected that dust was the culprit because the sensors, early in the first baling, produced responses that were proportional to windrow height and because there was no trend in malfunction that could be directly linked to temperature. Sensor lenses were cleaned after the first baling, which seemed to sometimes improve their function, but not always and not for long. The infrared distance sensor data was abandoned after the data from the first and second balings were analyzed. The infrared distance sensors were evaluated to not be the sensor to use for a hay yield monitor that determined cross sectional area and volume of the windrow.

The data for the ultrasonic sensors appeared to be proportional to windrow height. There were times in early testing when data from these sensors would abruptly begin demonstrating erratic operation though. After the sensors demonstrated erratic data, all the wiring was checked and protected using wire loom. After the wires were protected, the erratic operation of the sensors seemed to cease. After analyzing the data and performing one-way ANOVA, it was determined that the absolute yield prediction error for the ultrasonic sensors for different regression models was not statistically different between the models using four ultrasonic sensors and two ultrasonic sensors. After evaluation of the ultrasonic sensors, it was determined that data from only the two inside sensors was enough to have an accurate yield monitoring system for the hay yield monitor. When processing data, individual sensor responses that had negative values were replaced with zeros through a simple logic function.

The different linear regression models tested consisted of models with one regressor through the origin, one regressor with a non-zero y-intercept, two regressors through the origin, and two regressors with a non-zero y-intercept. In all models tested, wet weight, dry weight, wet mass flow, and dry mass flow across a given bale were each set as the dependent variables. In all models tested, ultrasonic sensor response was used as a regressor, or independent variable: in the mass flow prediction model's average sensor response across a bale was used and in the weight prediction models sum of sensor responses across a bale was used. The second regressor in the multiple regression models used was average moisture content in the bale as calculated from core samples that were taken from each bale and weighed, oven dried, and re-weighed.

Mass flow prediction models used average moisture across a bale and weight prediction models used sum of moisture values across a bale. The data were also analyzed using four ultrasonic sensors and also by only using the inner two ultrasonic sensors. Mass flow was defined as the weight of the bale divided by the number of readings collected for that bale; because each reading was collected at a given travel distance by the capacitance switch, this can be translated to mass per unit travel distance. Wet weight was defined as the weight of the bale recorded from the scale immediately after baling. Dry weight was defined as the wet weight corrected by the moisture content determined from oven-drying of the collected core samples.

The data analysis in the following discussion and tables represents three sequential tests. All comparisons were conducted in JMP 10.0 (SAS Institute Inc., Cary, N.C.) using one-way ANOVA and Student's t-tests to evaluate pooled prediction error for each bale within the indicated dataset. The tables show means comparisons developed using student's t-tests ($\alpha=0.05$) and connecting letters reports are for within sections (between divisions) of each table.

In the data presented below, the number of bales used for analysis for each dataset were: 55 bales for the 7-24 Banana baling, 9 bales for the 7-30 Alfalfa baling, 9 bales for the 7-31 Bermuda baling, 22 bales for the 9-11 Banana baling, and 14 bales for the 9-12 Bermuda baling. The All Bales dataset includes all 109 bales combined.

The first analysis performed was a comparison between the use of two or four ultrasonic sensors. Tables 1, 2, 3, & 4 demonstrate the results of Student's t-tests between regression models using the models that had the best numerical average absolute error when using two or four ultrasonic sensors. It was found that there were no significant differences between using two or four sensors for any of the fields that were baled on wet or dry prediction basis. Based on this conclusion, data analyses in tables 5-12 include models in which two ultrasonic sensors were used. Not all models contained moisture as a regressor because in some cases, the best model was not a multiple linear regression model.

Table 1 shows the comparison of average absolute errors for best two- and four-sensor models for wet weight prediction. Comparisons were made within datasets.

TABLE 1

| Dataset[1] | N[2] | Model[3] | Avg. Abs. Error, %[4] |
|---|---|---|---|
| Banana | 2 | Wt = f[Ht, MC] | 7.16 |
|  | 4 | Wt = f[Ht, MC] | 6.46 |
| Alfalfa | 2 | Wt = f[Ht, MC] | 3.10 |
|  | 4 | Wt = f[Ht, MC] | 3.07 |

TABLE 1-continued

| Dataset[1] | N[2] | Model[3] | Avg. Abs. Error, %[4] |
|---|---|---|---|
| Bermuda | 2 | Wt = f[Ht^4, MC] | 5.98 |
| | 4 | Wt = f[exp(Ht), MC] | 7.08 |
| Banana | 2 | Wt = f[Ht^(0.5), MC] | 3.83 |
| | 4 | Wt = f[Ht^(0.5), MC] | 3.68 |
| Bermuda | 2 | Wt = f[Ht, MC] | 4.62 |
| | 4 | Wt = f[Ht^(0.5), MC] | 4.53 |
| All Bales | 2 | Wt = f[Ht^2, MC] | 15.70 |
| | 4 | Wt = f[Ht^2, MC] | 14.02 |

Table 2 compares average absolute errors for best two- and foursensor models for wet mass flow prediction. Comparisons were made within datasets.

TABLE 2

| Dataset | N | Model | Avg. Abs. Error, % |
|---|---|---|---|
| Banana | 2 | MF = f[Ht^2] | 10.02 |
| | 4 | MF = f[Ht^2] | 7.51 |
| Alfalfa | 2 | MF = f[Ht^(0.5), MC] | 5.06 |
| | 4 | MF = f[Ht^2, MC] | 5.88 |
| Bermuda | 2 | MF = f[exp(Ht), MC] | 5.90 |
| | 4 | MF = f[ln(Ht), MC] | 7.12 |
| Banana | 2 | MF = f[Ht, MC] | 8.54 |
| | 4 | MF = f[Ht^2, MC] | 6.99 |
| Bermuda | 2 | MF = f[Ht^4, MC] | 13.97 |
| | 4 | MF = f[Ht^(0.25), MC] | 9.83 |
| All Bales | 2 | MF = f[Ht] | 22.17 |
| | 4 | MF = f[Ht^2] | 19.65 |

Table 3 provides comparison of average absolute errors for best two- and four-sensor models for dry weight prediction. Comparisons were made within datasets.

TABLE 3

| Dataset | N | Model | Avg. Abs. Error, % |
|---|---|---|---|
| Banana | 2 | Wt = f[Ht, MC] | 7.90 |
| | 4 | Wt = f[Ht, MC] | 7.29 |
| Alfalfa | 2 | Wt = f[Ht, MC] | 4.01 |
| | 4 | Wt = f[Ht^(0.5), MC] | 3.80 |
| Bermuda | 2 | Wt = f[Ht^2, MC] | 7.19 |
| | 4 | Wt = f[Ht, MC] | 7.81 |
| Banana | 2 | Wt = f[Ht, MC] | 3.81 |
| | 4 | Wt = f[Ht, MC] | 3.42 |
| Bermuda | 2 | Wt = f[Ht, MC] | 5.64 |
| | 4 | Wt = f[Ht^(0.5), MC] | 5.42 |
| All Bales | 2 | Wt = f[Ht^2, MC] | 17.60 |
| | 4 | Wt = f[Ht^2, MC] | 15.51 |

Table 4 provides comparison of average absolute errors for best two- and four-sensor models for dry mass flow prediction. Comparisons were made within datasets.

TABLE 4

| Dataset | N | Model | Avg. Abs. Error, % |
|---|---|---|---|
| Banana | 2 | MF = f[ln(Ht), MC] | 4.73 |
| | 4 | MF = f[exp(Ht), MC] | 4.81 |
| Alfalfa | 2 | MF = f[Ht^(0.5), MC] | 4.97 |
| | 4 | MF = f[Ht^2, MC] | 5.10 |
| Bermuda | 2 | MF = f[Ht^(0.25), MC] | 5.66 |
| | 4 | MF = f[exp(Ht), MC] | 5.66 |

TABLE 4-continued

| Dataset | N | Model | Avg. Abs. Error, % |
|---|---|---|---|
| Banana | 2 | MF = f[Ht, MC] | 8.23 |
| | 4 | MF = f[Ht^2, MC] | 6.88 |
| Bermuda | 2 | MF = f[Ht^4, MC] | 13.77 |
| | 4 | MF = f[Ht^(0.25), MC] | 9.60 |
| All Bales | 2 | MF = f[exp(Ht), MC] | 9.08 |
| | 4 | MF = f[Ht^(0.25), MC] | 8.89 |

In tables 5 through 8, models using one regressor and models using moisture as a second regressor were compared. It was found that using moisture as a second regressor in all datasets numerically improved the average absolute error for wet mass prediction and in most cases demonstrated a significantly reduced yield prediction error. For wet mass flow prediction, there were no significant differences between using moisture as a second regressor and using a single regression model. Table 7 shows that in some cases, there was significant difference when using moisture but not in all cases, but the average absolute error was numerically better when moisture was used. Table 8, which demonstrates comparisons for dry mass flow prediction, shows for the 2014 All Bales dataset that the average absolute error was significantly lower when using moisture as a second regressor than that for the single regression model; the average absolute error, when using moisture, was less than half of that when not using moisture. This was the only analysis of number of regressors where there was a significant difference for the 2014 All Bales dataset. The data in tables 5 through 8 generally suggest that yield prediction models are improved, if not significantly improved when knowledge of moisture is included.

Table 5 shows comparison of average absolute errors for two-sensor models using single and multiple linear regression for wet mass prediction. Comparisons were made within datasets.

TABLE 5

| Dataset | Type[1] | Model | Avg. Abs. Error, % |
|---|---|---|---|
| Banana | Single | Wt = f[Ht^2] | 10.16 |
| | Multiple | Wt = f[Ht, MC] | 7.16 |
| Alfalfa | Single | Wt = f[Ht^2] | 5.44 |
| | Multiple | Wt = f[Ht, MC] | 3.10 |
| Bermuda | Single | Wt = f[Ht^2] | 20.09 |
| | Multiple | Wt = f[Ht^4, MC] | 5.98 |
| Banana | Single | Wt = f[Ht^2] | 11.26 |
| | Multiple | Wt = f[Ht^(0.5), MC] | 3.83 |
| Bermuda | Single | Wt = f[Ht^4] | 14.35 |
| | Multiple | Wt = f[Ht, MC] | 4.62 |
| All Bales | Single | Wt = f[Ht^2] | 17.85 |
| | Multiple | Wt = f[Ht^2, MC] | 15.70 |

Table 6 shows comparison of average absolute errors for two-sensor models using single and multiple linear regression for wet mass flow prediction. Comparisons were made within datasets.

TABLE 6

| Date/Field | Type | Model | Avg. Abs. Error, % |
|---|---|---|---|
| Banana | Single | MF = f[Ht^2] | 10.02 |
| | Multiple | MF = f[Ht^2, MC] | 10.76 |

TABLE 6-continued

| Date/Field | Type | Model | Avg. Abs. Error, % |
|---|---|---|---|
| Alfalfa | Single | MF = f[Ht^4] | 5.50 |
|  | Multiple | MF = f[Ht^(0.5), MC] | 5.06 |
| Bermuda | Single | MF = f[exp(Ht)] | 12.26 |
|  | Multiple | MF = f[exp(Ht), MC] | 5.90 |
| Banana | Single | MF = f[Ht] | 10.41 |
|  | Multiple | MF = f[Ht, MC] | 8.54 |
| Bermuda | Single | MF = f[Ht^4] | 15.15 |
|  | Multiple | MF = f[Ht^4, MC] | 13.97 |
| All Bales | Single | MF = f[Ht] | 22.17 |
|  | Multiple | MF = f[Ht, MC] | 23.86 |

Table 7 shows comparison of average absolute errors for two-sensor models using single and multiple linear regression for dry mass prediction. Comparisons were made within datasets.

TABLE 7

| Dataset | Type | Model | Avg. Abs. Error, % |
|---|---|---|---|
| Banana | Single | Wt = f[Ht^2] | 9.13 |
|  | Multiple | Wt = f[Ht, MC] | 7.90 |
| Alfalfa | Single | Wt = f[Ht^2] | 5.21 |
|  | Multiple | Wt = f[Ht, MC] | 4.01 |
| Bermuda | Single | Wt = f[Ht^2] | 20.24 |
|  | Multiple | Wt = f[Ht^2, MC] | 7.19 |
| Banana | Single | Wt = f[Ht^2] | 10.49 |
|  | Multiple | Wt = f[Ht, MC] | 3.81 |
| Bermuda | Single | Wt = f[Ht^4] | 13.59 |
|  | Multiple | Wt = f[Ht, MC] | 5.64 |
| All Bales | Single | Wt = f[Ht^2] | 18.61 |
|  | Multiple | Wt = f[Ht^2, MC] | 17.60 |

Table 8 shows comparison of average absolute errors for two-sensor models using single and multiple linear regression for dry mass flow prediction.
Comparisons were made within datasets.

TABLE 8

| Dataset | Type | Model | Avg. Abs. Error, % |
|---|---|---|---|
| Banana | Single | MF = f[Ht^2] | 9.30 |
|  | Multiple | MF = f[ln(Ht), MC] | 4.73 |
| Alfalfa | Single | MF = f[ln(Ht)] | 4.88 |
|  | Multiple | MF = f[Ht^(0.5), MC] | 4.97 |
| Bermuda | Single | MF = f[exp(Ht)] | 12.52 |
|  | Multiple | MF = f[Ht^(0.25), MC] | 5.66 |
| Banana | Single | MF = f[Ht] | 9.54 |
|  | Multiple | MF = f[Ht, MC] | 8.23 |
| Bermuda | Single | MF = f[Ht^4] | 14.35 |
|  | Multiple | MF = f[Ht^2, MC] | 14.40 |
| All Bales | Single | MF = f[Ht] | 20.00 |
|  | Multiple | MF = f[exp(Ht), MC] | 9.08 |

Tables 9 and 10 compare mass and mass flow prediction errors for wet basis (Table 9) and dry basis (Table 10) predictions using moisture as a second regressor. Wet mass prediction errors were significantly lower than wet mass flow prediction errors in most cases. There was only one instance of wet mass flow prediction error being numerically lower than wet mass prediction error, but it they were not significantly different. In Table 10, the dry mass flow prediction was significantly better than the dry mass prediction for all bales. Across the other datasets, there were also generally significant differences between errors of mass and mass flow prediction models, but the model type with the significantly lowest error was not consistent. General observation of the transformations of ultrasonic sensor response that yielded the most successful models within each dataset shows that Ht was the most common transformation, suggesting that when moisture is used as a regressor, hay yield may be linear in relationship to ultrasonic sensor response.

Table 9 shows comparison of average absolute errors for two-sensor models using moisture as a second regressor predicting wet mass and wet mass flow. Comparisons were made within datasets.

TABLE 9

| Dataset | Type | Model | Avg. Abs. Error, % |
|---|---|---|---|
| Banana | Mass | Wt = f[Ht, MC] | 7.16 |
|  | M.F. | MF = f[Ht^2, MC] | 10.76 |
| Alfalfa | Mass | Wt = f[Ht, MC] | 3.10 |
|  | M.F. | MF = f[Ht^(0.5), MC] | 5.06 |
| Bermuda | Mass | Wt = f[Ht^4, MC] | 5.98 |
|  | M.F. | MF = f[exp(Ht), MC] | 5.90 |
| Banana | Mass | Wt = f[Ht^(0.5), MC] | 3.83 |
|  | M.F. | MF = f[Ht, MC] | 8.54 |
| Bermuda | Mass | Wt = f[Ht, MC] | 4.62 |
|  | M.F. | MF = f[Ht^4, MC] | 13.97 |
| All Bales | Mass | Wt = f[Ht^2, MC] | 15.70 |
|  | M.F. | MF = f[Ht, MC] | 23.86 |

Table 10 shows comparison of average absolute errors for two-sensor models using moisture as a second regressor predicting dry mass and dry mass flow. Comparisons were made within datasets.

TABLE 10

| Dataset | Type | Model | Avg. Abs. Error, % |
|---|---|---|---|
| Banana | Mass | Wt = f[Ht, MC] | 7.90 |
|  | M.F. | MF = f[ln(Ht), MC] | 4.73 |
| Alfalfa | Mass | Wt = f[Ht, MC] | 4.01 |
|  | M.F. | MF = f[Ht^(0.5), MC] | 4.97 |
| Bermuda | Mass | Wt = f[Ht^2, MC] | 7.19 |
|  | M.F. | MF = f[Ht^(0.25), MC] | 5.66 |
| Banana | Mass | Wt = f[Ht, MC] | 3.81 |
|  | M.F. | MF = f[Ht, MC] | 8.24 |
| Bermuda | Mass | Wt = f[Ht, MC] | 5.64 |
|  | M.F. | MF = f[Ht^4, MC] | 13.77 |
| All Bales | Mass | Wt = f[Ht^2, MC] | 17.60 |
|  | M.F. | MF = f[exp(Ht), MC] | 9.08 |

Tables 11 and 12 compare mass and mass flow models for wet (Table 11) and dry (Table 12) yield predictions, excluding moisture as a regressor. There were no significant differences between mass and mass flow predictions on a wet or dry basis within any of the datasets. This data is suggestive that model structure is flexible for yield predictions that do not use knowledge of moisture content for yield prediction. It should be noted that the majority of the models use the Ht2 transformation, suggesting that weight and mass flow may be nonlinear with respect to ultrasonic sensor response and that it may be best characterized as a function of the square of sensor response.

Table 11 shows the comparison of average absolute errors for two-sensor single regressor models predicting wet mass and wet mass flow. Comparisons were made within datasets.

TABLE 11

| Dataset | Type | Model | Avg. Abs. Error, % |
|---|---|---|---|
| Banana | Mass | Wt = f[Ht^2] | 10.16 |
|  | M.F. | MF = f[Ht^2] | 10.02 |
| Alfalfa | Mass | Wt = f[Ht^2] | 5.44 |
|  | M.F. | MF = f[Ht^4] | 5.50 |
| Bermuda | Mass | Wt = f[Ht] | 17.98 |
|  | M.F. | MF = f[exp(Ht)] | 12.26 |
| Banana | Mass | Wt = f[Ht^2] | 11.26 |
|  | M.F. | MF = f[Ht] | 10.41 |
| Bermuda | Mass | Wt = f[Ht^4] | 14.35 |
|  | M.F. | MF = f[Ht^4] | 15.15 |
| All Bales | Mass | Wt = f[Ht^2] | 17.85 |
|  | M.F. | MF = f[Ht] | 22.17 |

Table 12 shows comparison of average absolute errors for two-sensor single regressor models, predicting dry mass and dry mass flow. Comparisons were made within datasets.

TABLE 12

| Dataset | Type | Model | Avg. Abs. Error, % |
|---|---|---|---|
| Banana | Mass | Wt = f[Ht^2] | 9.13 |
|  | M.F. | MF = f[Ht^2] | 9.30 |
| Alfalfa | Mass | Wt = f[Ht^2] | 5.21 |
|  | M.F. | MF = f[ln(Ht)] | 4.88 |
| Bermuda | Mass | Wt = f[Ht^2] | 20.24 |
|  | M.F. | MF = f[exp(Ht)] | 12.52 |
| Banana | Mass | Wt = f[Ht^2] | 10.49 |
|  | M.F. | MF = f[Ht] | 9.54 |
| Bermuda | Mass | Wt = f[Ht^4] | 13.59 |
|  | M.F. | MF = f[Ht^4] | 14.35 |
| All Bales | Mass | Wt = f[Ht^2] | 18.61 |
|  | M.F. | MF = f[Ht] | 20.00 |

Figure 6:
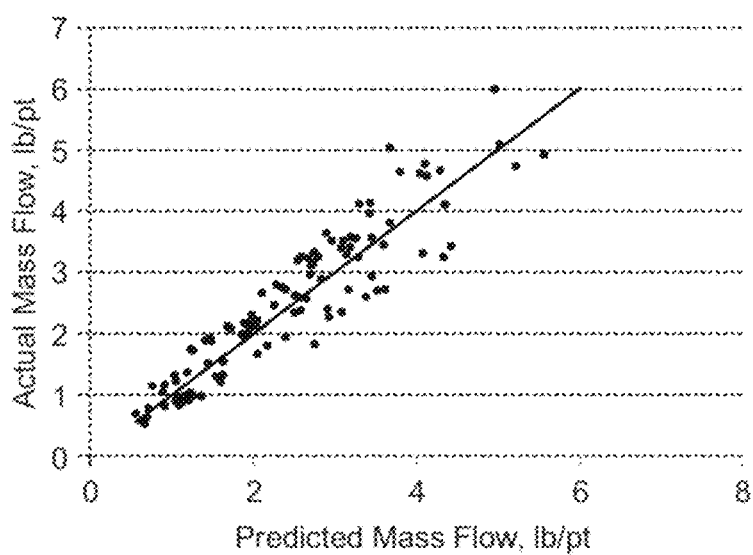
FIG. 6 graphically compares the actual mass flow measurements of a hay field harvest with determinations obtained by use of a system as disclosed herein.

FIG. 6 graphically demonstrates the results of all bales examined with regard to actual mass flow determined in pounds per point (lb/pt) as measured by the capacitor sensor (i.e., per each 16 inch length measurement) as a function of the predicted mass flow.

Figure 7:
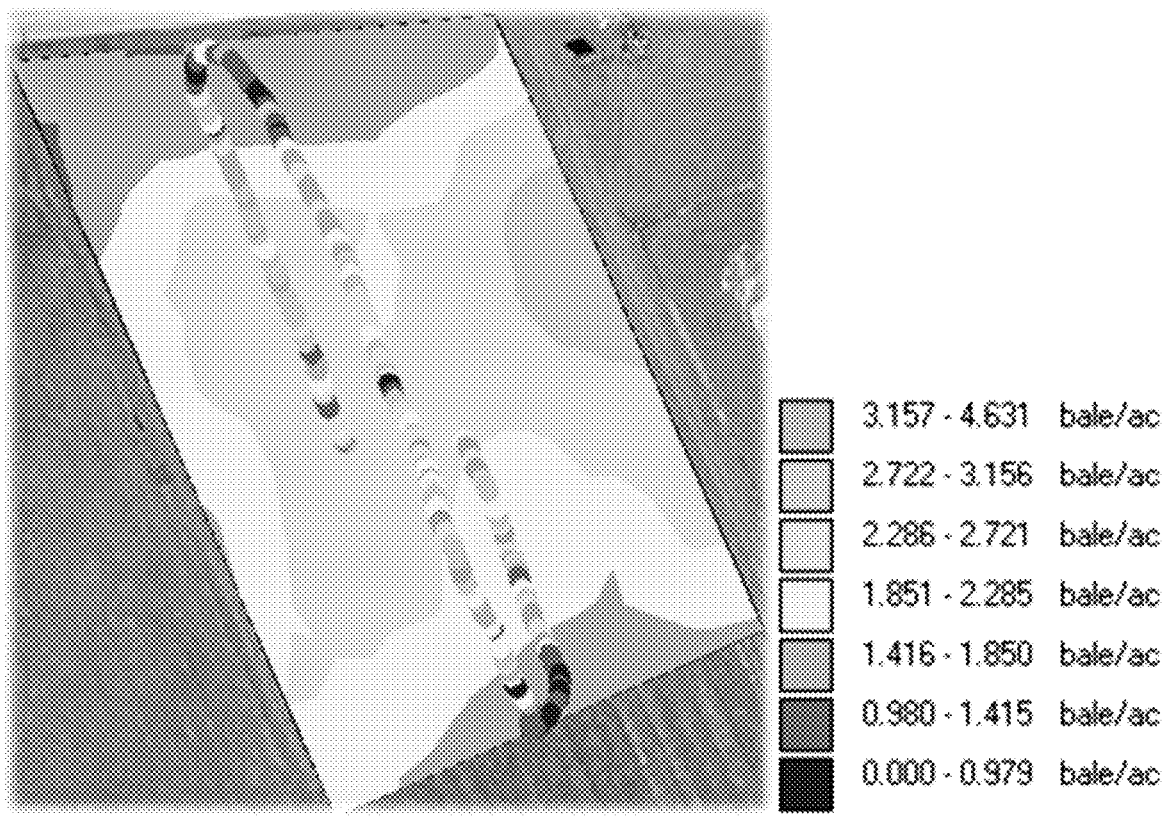
FIG. 7 is a yield map produced by use of a system as described herein.

FIG. 7 shows a yield map that was developed using Farmworks™ (Trimble, Hamilton, Ind.) for an alfalfa dataset. Point data predicting wet weight as a function of sum of ultrasonic sensor response across each bale was converted to weight per unit area, or yield, by dividing by the field area represented by each point, which was calculated as the distance between points (as defined by the wheel lug spacing) multiplied by the windrow spacing (as defined by the hay rake used. The mass yield per unit acre was then divided by the average weight per bale to provide bales per acre. Two of several point data sets (bales) used to construct the map are shown in the figure, overlayed on a contoured yield map using all point datasets (bales). The higher yielding areas along with the lower yielding areas are indicated on this map as a demonstration for how the technology presented here could be applied for guidance of management decisions.

Example 2

The Phidgets ultrasonic sensors described above in Example 1 were replaced by Maxbotix 7060, Maxbotix 7067 (MaxBotix Inc., Brainerd, Minn.), and model T30UXDA ultrasonic sensors (Banner Engineering Inc., Minneapolis, Minn.). The 7060 sensors demonstrated problems. The T30UXDA sensors consistently responded proportionately with the target distance regardless of whether or not the sensor platform was in forward motion and demonstrated a higher level of resolution because the sensors were designed for a 1 meter distance range, therefore utilizing almost all of the window of sight between the baler tongue and ground.

Figure 8:
FIG. 8 is a program display for data acquisition software showing dynamically updated values for ultrasonic sensor output, bale chamber position, hydraulic pressure at kicker, moisture sensor output, and GPS position information.

A data acquisition program display is provided in FIG. 8; the need for tagging hay bales was eliminated to reduce labor required for data collection and to reduce opportunities for human error. To accomplish this, the hay yield monitoring program was modified to record the GPS coordinates (latitude, longitude) of where each bale was ejected. A GPS offset opposite the direction of travel of 4.6 m (15 ft) was applied to each bale, based on visual observation of generally how far the bale rolled after ejection. Along with the coordinates, the ejection time and bale number was recorded. A limit switch installed on the baler from the manufacturer to indicate if the chamber was open or closed was used as a digital input to the I/O board to indicate bale ejection. Sometimes when baling hay, it becomes necessary to open and close the bale chamber more than once while sitting in one spot on the occasion that the baler clogs up or the bale doesn't wrap. To avoid logging points more than once or advancing the bale number more than once if the bale chamber was opened multiple times, the program was written so that the coordinates would only be logged and the bale number only be advanced if the baler had travelled in a forward motion since the prior log record; this was indicated through use of the capacitance switch. If the capacitance switch had not been triggered by the wheel lug since the last bale ejection event and the bale chamber was opened, the coordinates would not be recorded to the excel file.

Figure 9:
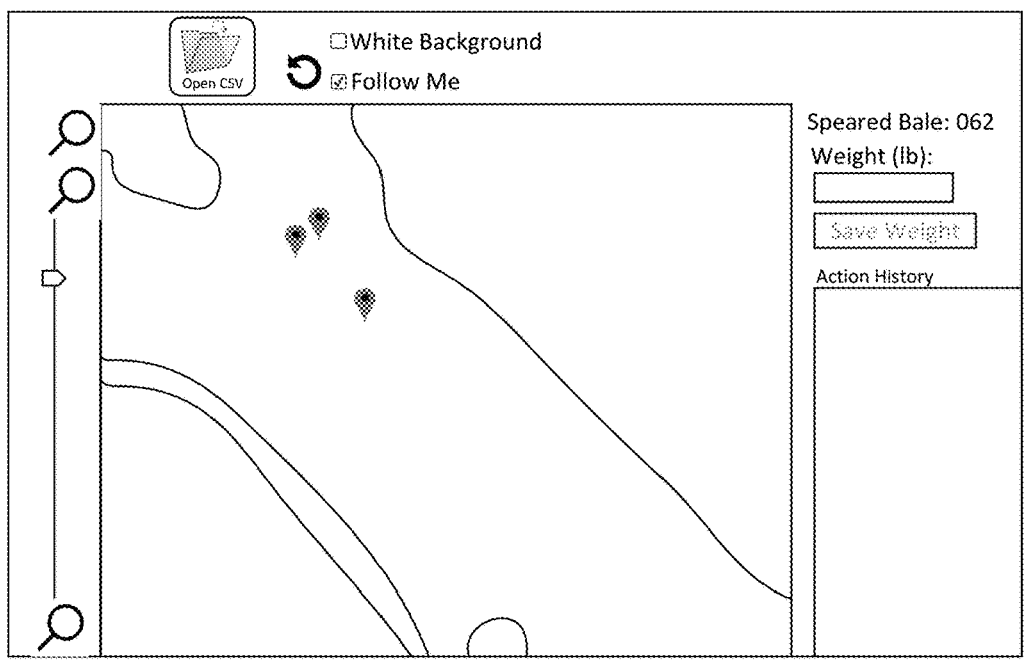
FIG. 9 presents a display for a Bale Chaser program that was written to collect and weigh bales.

The data logged for bale position was then opened in another program, the "Bale Chaser" program that was also written with Microsoft Visual Basic (FIG. 9). The Bale Chaser program displayed markers on a map that corresponded with the GPS coordinates of the bale, along with current position and travel direction of the tractor. A GPS antenna and receiver was installed on a tractor with a front end loader. The magnetic GPS antenna was placed on the loader close to where the bale spear attached in order to get the bale spear closer to the bale without the need for applying an offset. When a bale was picked up, the user specified which bale was collected and a text box labeled weight became visible on the screen. After the bale was weighed, the weight was recorded in that box and saved to a text file, which was later merged with the mass flow, moisture, and kicker pressure sensor data for that bale.

Figure 10:
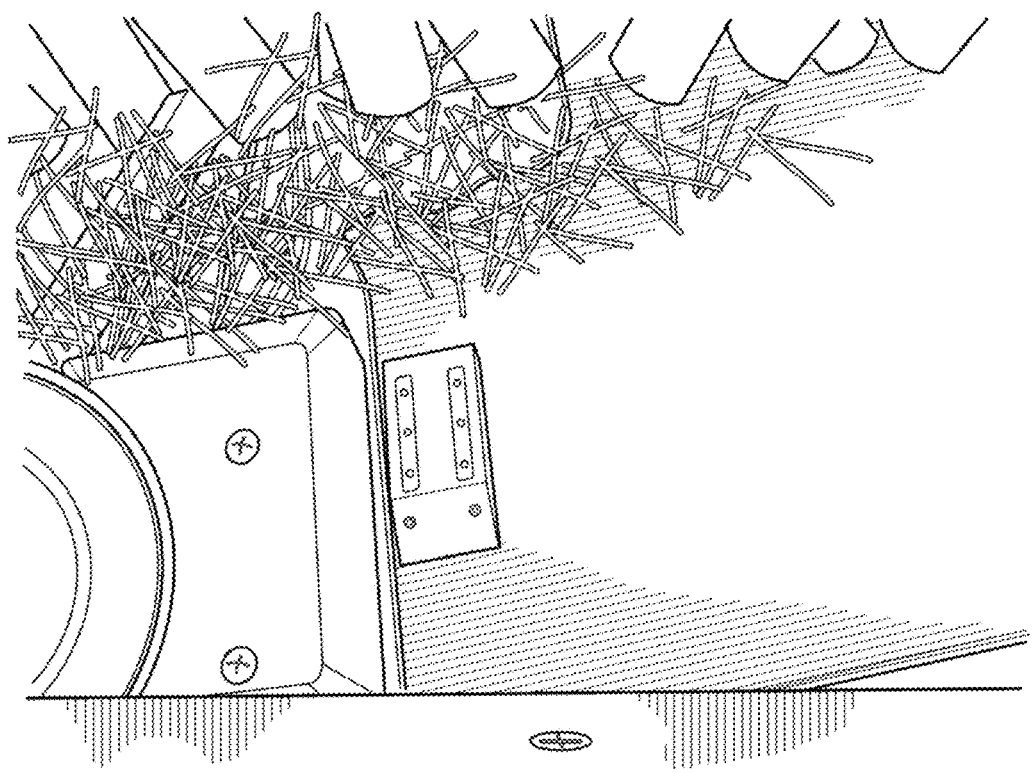
FIG. 10 illustrates a moisture sensor as may be incorporated in a system as described.

Two Model BHT-2 moisture sensor pads (Agratronix, Streetsboro, Ohio) were installed in the bale chamber—one on the left side and one on the right side—according to manufacturer specifications (FIG. 10). The Agra-tronix moisture sensors were added to the baler to determine if the sensors could provide on-the-go moisture data.

The Agritronix calibration was estimated by providing a known resistance across the electrodes and recording the moisture indicated on the display. For data logging, a voltage divider circuit was constructed for each moisture pad and wired into the analog inputs of the I/O board. The voltage divider was constructed as shown below, with the 5V supply and ground connected to the I/O board. In the diagram, R1 was a 1 MΩ resistor and R2 represented the unknown resistance created by the hay contacting the sensor pads' electrodes. One electrode was connected directly to the ground of the I/O board and A10 was connected to an analog input on the I/O board. The unknown resistance of the hay, or R2 was calculated as:

$$R2 = \frac{R1}{\frac{V_{in}}{V_{out}} - 1},$$

where,

R2=resistance of hay across electrodes, MΩ

R1=known resistance, 1 MΩ

$V_{in}$=supply voltage, 5 V

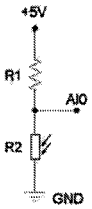

$V_{out}$=measured voltage at I/O board, V

There were two datasets collected with the model T30UXDA sensors, and the data provided good results with average absolute yield prediction errors as low as 5.11%.

Figure 11:
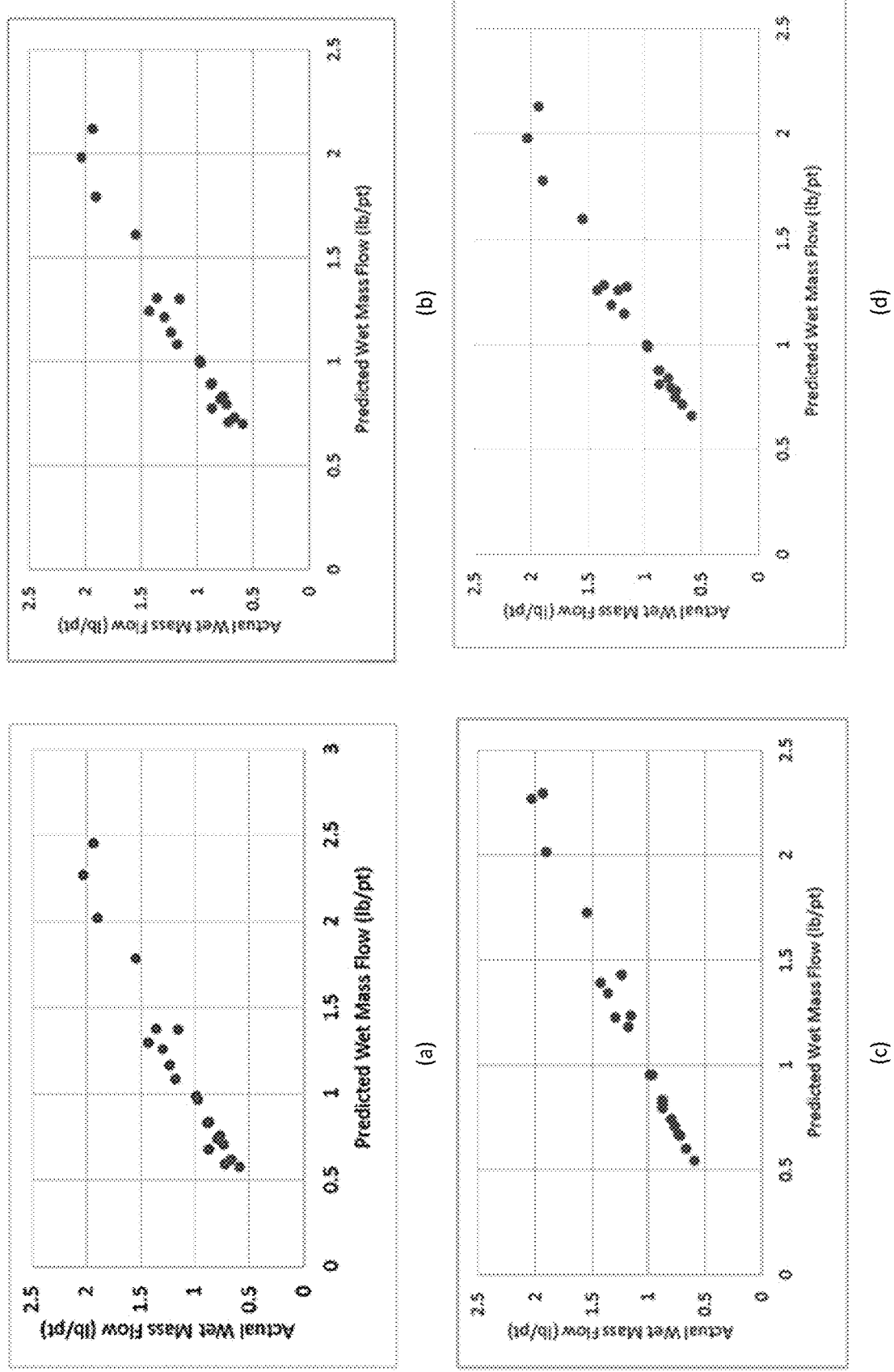
FIG. 11 presents the relationship between wet mass flow prediction by use of disclosed systems and actual, or measured, wet mass flow.
Figure 12:
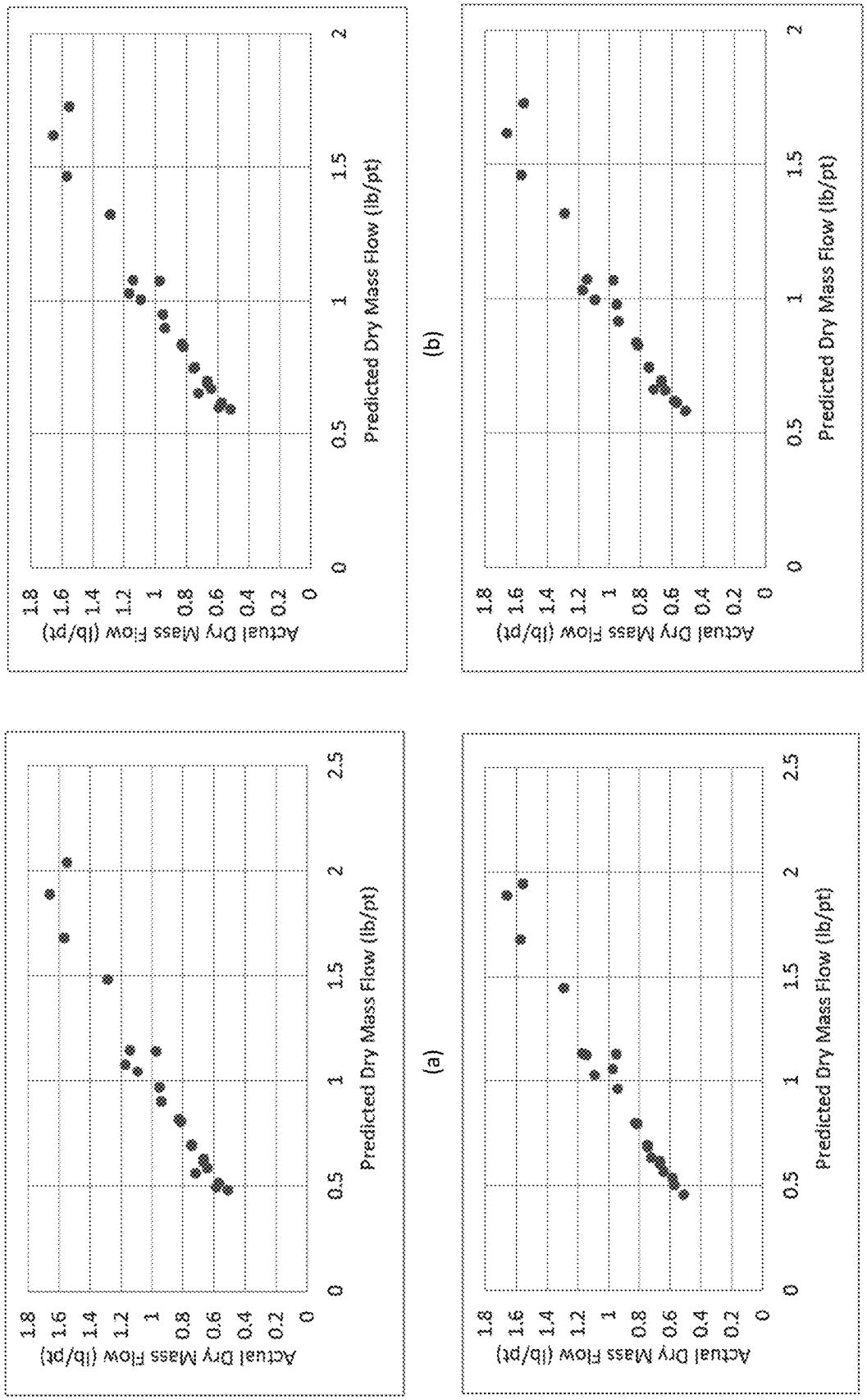
FIG. 12 presents the relationship between dry mass flow predicted by use of disclosed systems and actual, or measured, dry mass flow.

FIG. 11 (wet basis) and FIG. 12 (dry basis) display charts that were developed using data from harvesting 21 bales in the Banana field. The data displayed shows wet mass flow prediction (lb/pt) for four different analysis methods as described in Table 13, below

TABLE 13

| Chart | y-intercept | $1^{st}$ Regressor | $2^{nd}$ Regressor | Avg. Abs. Error, % |
|---|---|---|---|---|
| a | Zero | Sum | None | 8.62 |
| b | Non-zero | Average | None | 6.71 |
| c | Zero | Sum | Moisture | 7.53 |
| d | Non-zero | Average | Moisture | 5.11 |

A single regressor model was used for FIG. 11 at a to predict mass as a function of sum of ultrasonic sensor responses. FIG. 11 at b uses a single regressor model predicting mass flow as a function of average ultrasonic sensor response. FIG. 11 at c and at d are two-regressor models using the same regressors as at a and b, respectively, along with use of moisture content as a second regressor. FIG. 11 at a and c are forced through the origin while FIG. 11 at b and d have a non-zero intercept. Average absolute errors for the models depicted in FIG. 11 are displayed in Table 13.

In FIG. 12, the charts show actual (measured) dry mass flow as a function of predicted dry mass flow, both as units of lb/pt. Models used to develop FIG. 12 (Table 14) are the same as those described to develop FIG. 11, except that the models for FIG. 12 predict dry yield and those for FIG. 11 predict wet yield. For both wet and dry yield prediction models, models predicting mass flow as a function of average ultrasonic sensor response demonstrated numerically less error than those predicting mass as a function of sum of sensor responses. In both cases (wet and dry), inclusion of moisture knowledge slightly improved yield prediction error, but not substantially.

TABLE 14

| Chart | y-intercept | $1^{st}$ Regressor | $2^{nd}$ Regressor | Avg. Abs. Error, %[4] |
|---|---|---|---|---|
| a | Zero | Sum | None | 9.27 |
| b | Non-zero | Average | None | 5.57 |
| c | Zero | Sum | Moisture | 9.16 |
| d | Non-zero | Average | Moisture | 5.39 |

Figure 13:
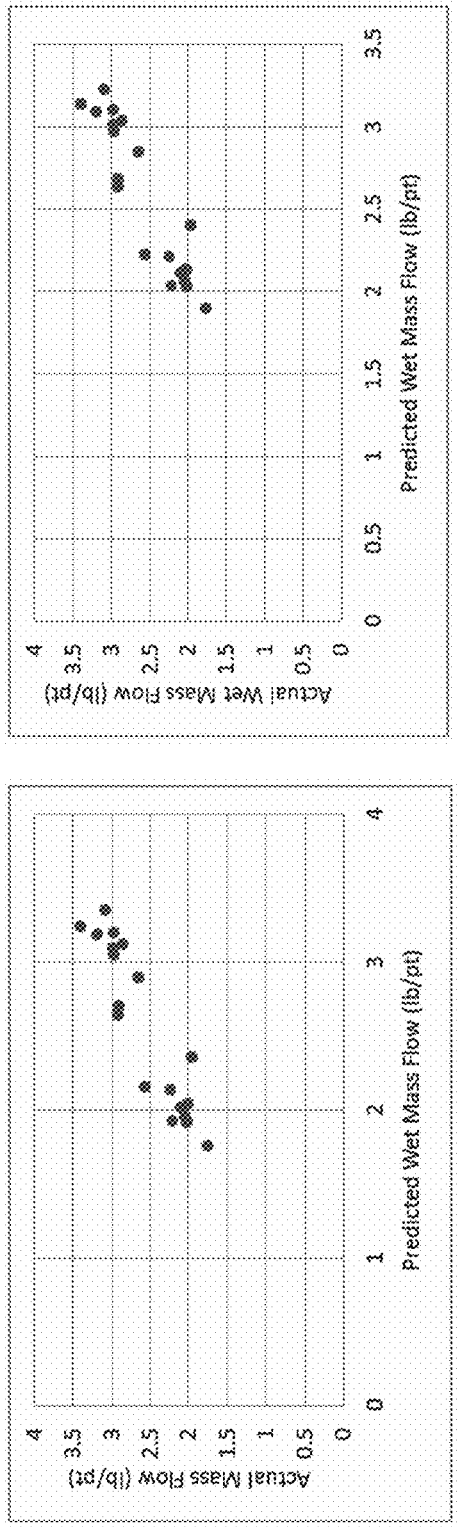
FIG. 13 shows the relationship between wet mass flow and predicted by use of disclosed systems actual wet mass flow.

FIG. 13 displays data from a dataset collected from harvest in a Bermuda field. The dataset consists of 20 bales that were harvested. No moisture data was collected for the dataset. Table 15 displays average absolute errors for the two methods of error determination. FIG. 13 at a uses the sum of sensor readings for analysis and is forced through the origin. FIG. 13 at b uses the average of sensor readings for analysis and is not forced through the origin. Table 15 shows the average absolute errors of the two charts.

TABLE 15

| Chart | y-intercept | $1^{st}$ Regressor | $2^{nd}$ Regressor | Avg. Abs. Error, % |
|---|---|---|---|---|
| a | Zero | Sum | None | 6.61 |
| b | Non-zero | Average | None | 5.80 |

Example 3

Figure 14:
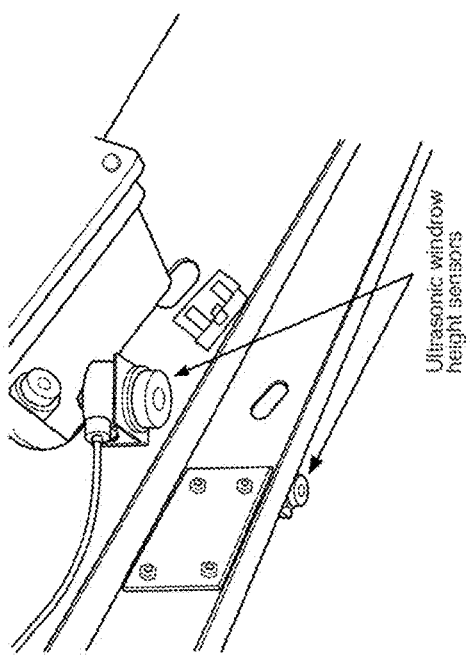
FIG. 14 illustrates ultrasonic windrow height sensors as installed on tongue of a baler.

A system was installed on two round balers: a New Holland Roll Belt Model 450 Silage Special and a John Deere Model 459 Silage Special. Both systems utilized a pair of Banner Engineering Model T30UXDA ultrasonic sensors mounted at each side of the baler tongue near the windrow pickup as shown in FIG. 14. This system eliminated the capacitance travel distance switches utilized in Example 2 and modified the mass flow prediction algorithm to support their absence.

Figure 15:
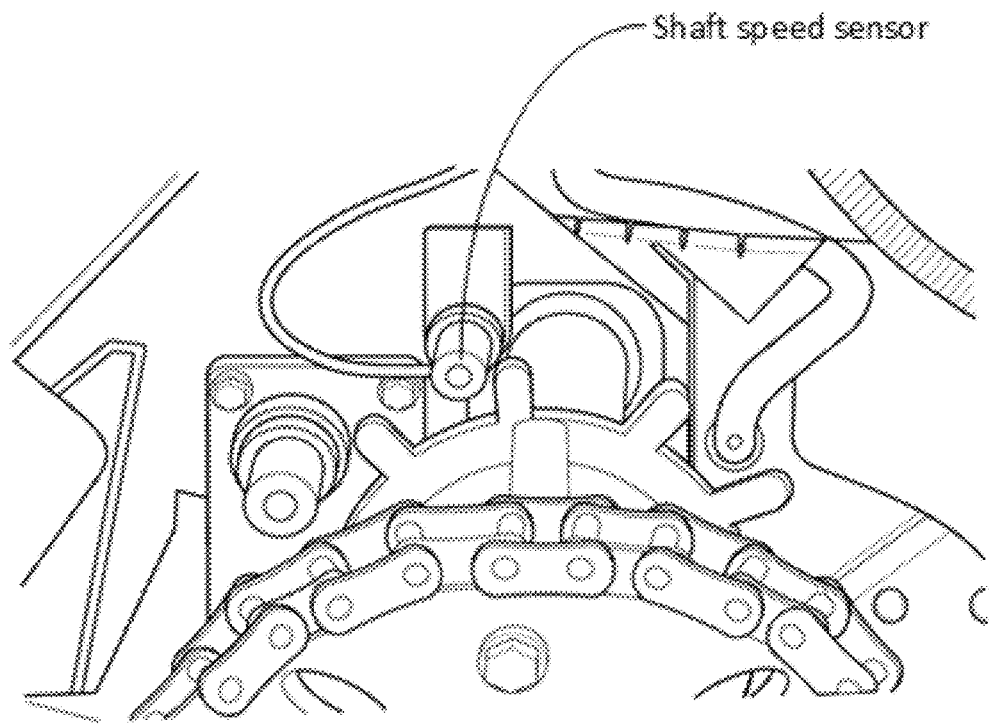
FIG. 15 illustrates a shaft speed sensor as installed on a baler reading speed pick-up on baler shaft turning at a speed proportional to PTO speed.

Voltage dividers were provided for the 0-10V return ultrasonic sensors to accommodate a 5V analog input controller. A John Deere model AH116104 shaft speed sensor was installed on each baler to indicate PTO shaft speed (FIG. 15) and both balers were equipped with sub-meter accuracy GPS units. The components from each system were wired into a programmable controller, which transmitted to mass flow data to a commercially available yield monitoring display.

A Boolean "IsHarvesting?" variable was updated continuously to indicate in data logging if harvesting was underway. For "IsHarvesting?" to be set to True, it was required that the following four conditions be satisfied: PTO shaft speed exceeded threshold (value varies depending on baler), predicted windrow height exceeded threshold (3-4 inches was used), GPS-indicated ground speed exceeded threshold (1-2 mph was used), and predicted mass flow was non-negative. The threshold PTO shaft speed allowed the system to automatically pause recording if the PTO shaft was disengaged or fell below normal speeds for harvest. Inclusion of a threshold windrow height allowed data recording to be paused if the operator crossed a path that had already been crossed, such as is sometimes the case when transiting from one area of the field to another but with the PTO shaft still engaged. The threshold ground speed allowed logging to be automatically paused at each bale discharge as the operator was decelerating, stopped, and accelerating; normal baling speeds are in excess of 2 mph. Because the default calibration of the algorithm was developed for normal mass flow rates during hay harvest, inordinately low mass flow rates such as those experienced at low ground speeds immediately prior to and immediately after stopping to discharge a bale could be predicted as values less than zero. A threshold mass flow rate of zero prevented recording negative mass flow values.

Because the travel distance trigger was eliminated in this embodiment, algorithm modifications were carried out to accommodate a system that logged at a specific time frequency rather than at specific travel distance intervals. Using data collected in previous examples, Equation 1 was developed as a simple linear regression model using the product of windrow height and ground speed to predict hay mass flow rate at 1 Hz:

$$MF=0.087459*(S*WH)-2.3417, \quad \text{(Eq. 1)}$$

where

MF represents predicted mass flow rate in kg/s,

S represents ground speed in kph, and

WH represents windrow height as indicated by the ultrasonic sensors.

A second algorithm was developed to predict hay mass flow rate in two steps: prediction of windrow mass density (Equation 2) followed by calculation of mass flow rate as a function of windrow mass density and ground speed (Equation 3):

$$MD=0.26785*WH-0.56083 \text{ and} \quad \text{(Eq. 2)}$$

$$MF=MD*S*k \quad \text{(Eq. 3)}$$

where MD represents windrow mass density in kilograms per meter of windrow length and constant k is equal to $0.27778 \text{ m hr km}^{-1} \text{ sec}^{-1}$.

In either case, the predicted mass flow rate delivered to the yield monitoring platform was divided by the product of ground speed and windrow spacing to calculate a yield estimate, for example in units of lb/ac. These two mass flow algorithms were compared with almost indiscernible results.

The systems installed on both balers were operable and data logging was reliable and robust across hundreds of acres baled. Bale weights were measured for the John Deere Model 459 baler for assessment of mass flow prediction accuracy using the algorithms presented above.

Figure 16:
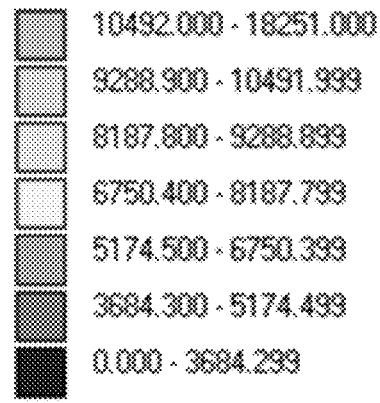
FIG. 16 presents a yield map generated using systems and methods as described herein.
Figure 17:
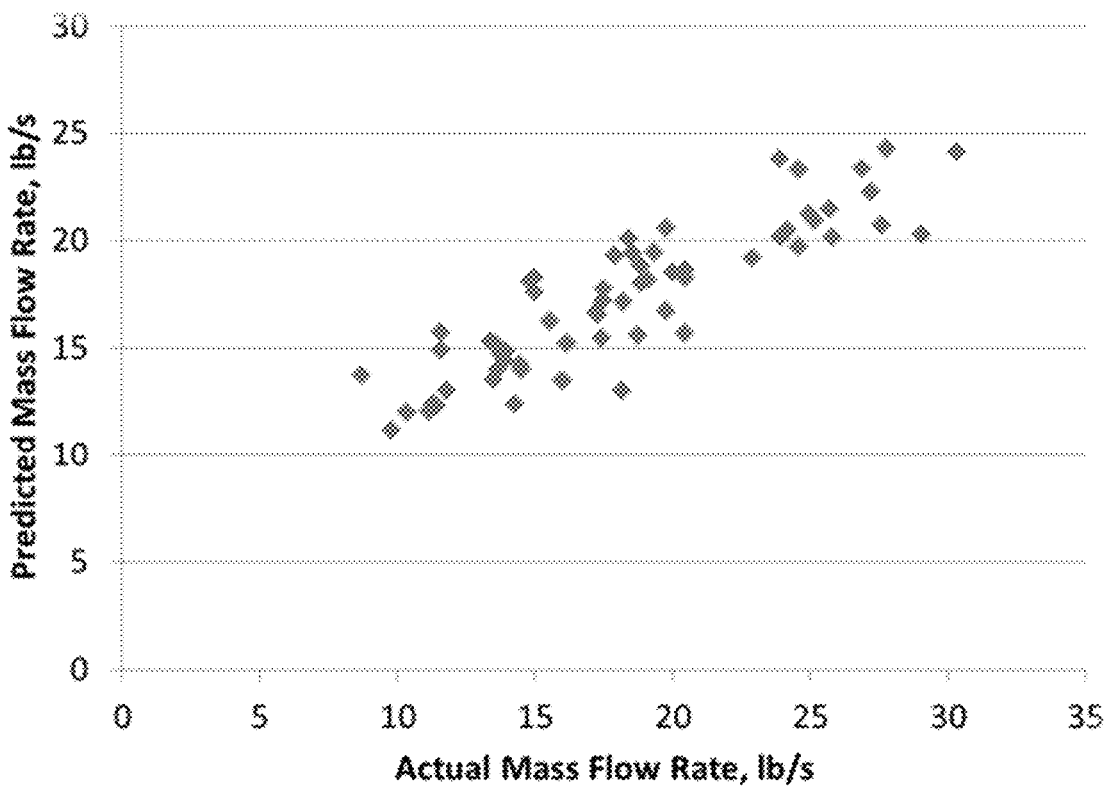
FIG. 17 presents predicted mass flow rate as determined by use of a system as described herein vs. actual mass flow rate.

An example of the performance of the yield monitoring system installed on the John Deere 459 baler is presented here as the baling of a 16 ac field comprised of a blend of Tift-85 and coastal Bermuda grass. Bale harvesting duration was defined from the "IsHarvesting?" variable previously defined and divided into the measured weights of 62 bales from the field to define actual mass flow rates for each bale. Predicted mass flow rates for each bale were calculated as the average predicted mass flow rates logged for each bale using Eq. 1 above and delivered to the yield monitoring platform, which produced the yield map shown in FIG. 16. A calibration factor of 0.868 was calculated by dividing the sum of the 62 actual bale weights by the sum of the 62 predicted bale weights. Application of this calibration factor resulted in the relationship between calibrated, predicted mass flow rate and actual mass flow rate seen in FIG. 17. Average absolute mass flow prediction error for the data presented in FIG. 17 was 12.6%. This error could likely be reduced with improvement of the model to correct for non-linearization.

Example 4

Figure 18:
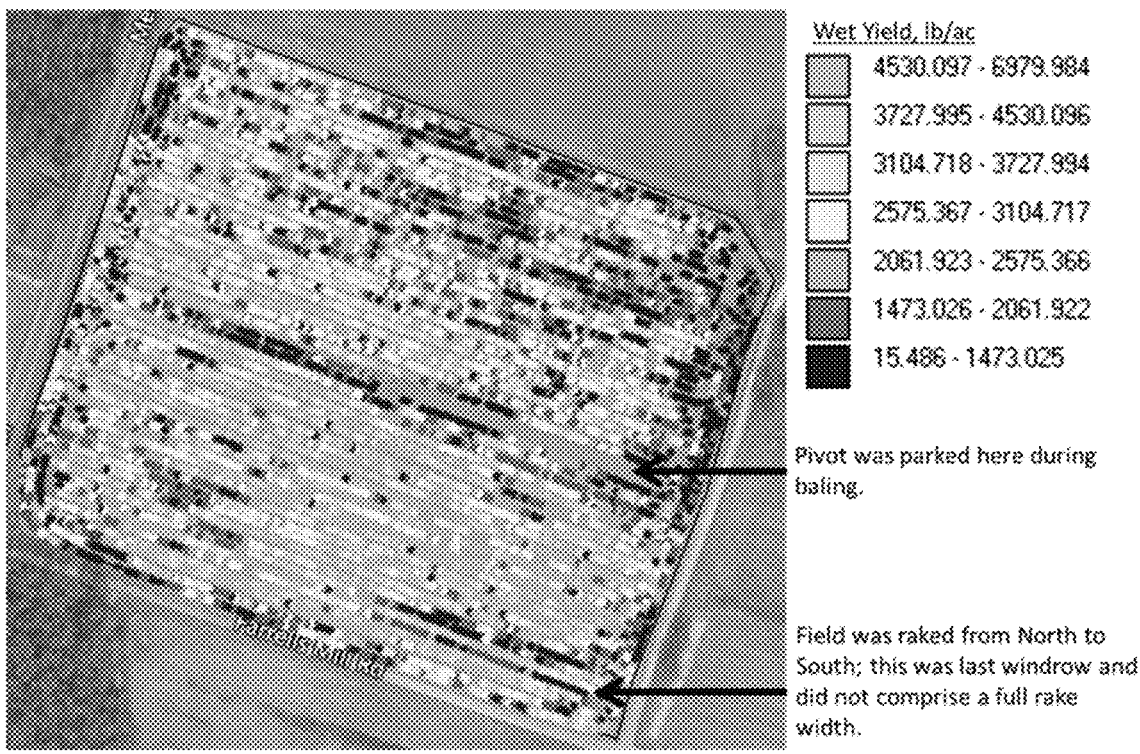
FIG. 18 illustrates a yield map generated using systems and methods as described herein.
Figure 19:
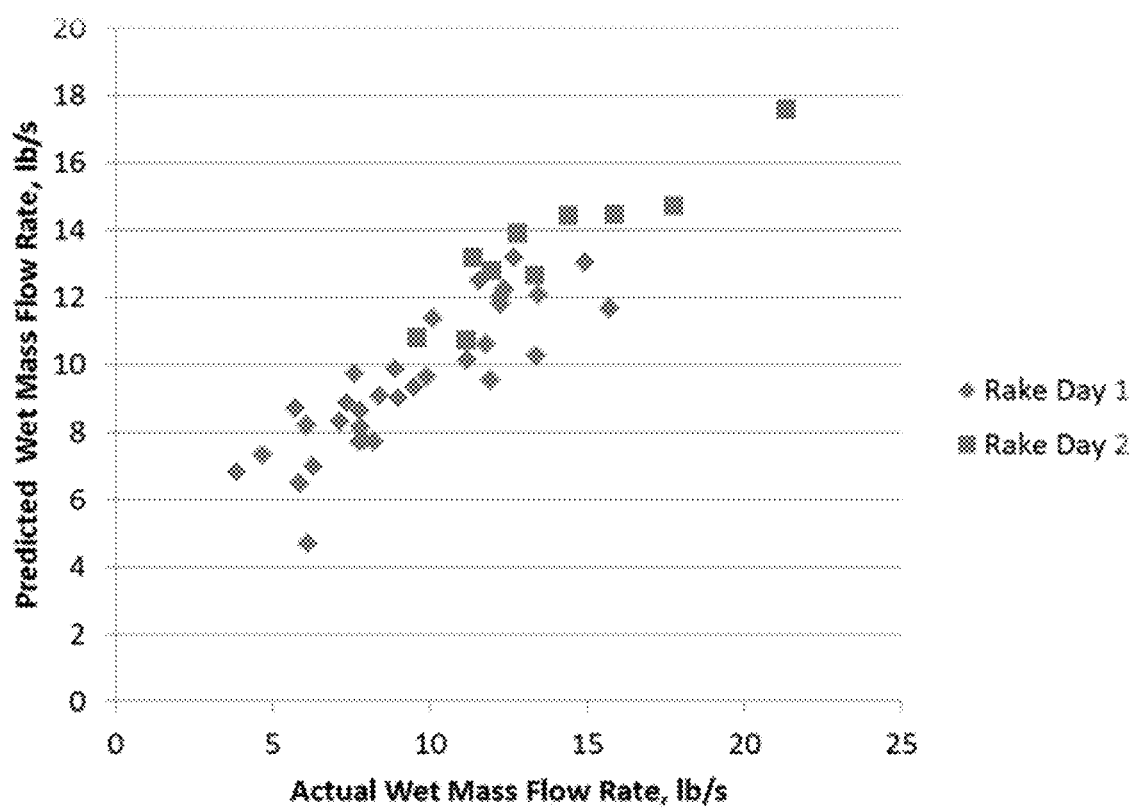
FIG. 19 compares actual vs. predicted mass flow rates for the calibrated mass flow prediction data on the test where hay was raked a day prior to baling and where hay was raked on the same day as baling.

To evaluate the effect of length of time between raking and baling, half of a 25 ac field of Tifton-85 Bermuda grass was raked one day prior to baling and the other half was raked on the same day as baling. Because height of the windrow was used to predict hay mass flow rate and because the windrow settles with time, it was expected that mass flow predictions would be underestimated for hay raked a day prior to baling. Equation 1 above was applied to the sensor data to predict mass flow rates, 33 bales from the field were weighed, and harvesting duration for each bale was determined from the "IsHarvesting?" variable described above. Comparison of predicted mass flow rates using the default calibration in Equation 1 to the mass flow rates actually harvested confirmed expectations, yield predictions were underestimated when raking was performed one day prior to baling. Mathematical division of actual mass flow rates by predicted mass flow rates (based on a default calibration) resulted in a calibration factor, or scalar multiple of 1.59 for the data raked a day prior to baling and a calibration factor of 0.96 for the data raked on the day of baling. While the default calibration resulted in under-prediction of mass flow rates and therefore yield for the hay baled one day after raking, the mass flow and therefore yield predictions were still relatively consistent (i.e., sensed high and low yielding areas were respectively consistent with actual high and low yielding areas). These calibration factors were used to correct mass flow predictions to create a yield map (FIG. 18). Absolute mass flow prediction errors were calculated for each bale based on the calibrated mass flow rates (FIG. 19); the average absolute error for hay raked a day prior to baling was 15.8% and the average absolute error for hay raked on the same day as baling was 9.6%. While not conclusive, the data in this example suggested that mass flow prediction errors for this system may be decreased by accounting for time between raking and baling, although for most conventional hay production systems this should not be a concern because time between raking and baling is generally short.

These and other modifications and variations of the present invention may be practiced by those of ordinary skill in the art, without departing from the spirit and scope of the present invention. In addition, aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. A yield monitoring system comprising:
   a windrow collecting implement having an operating width representing a distance between adjacent windrows;
   a downward scanning first sensor carried by the windrow collecting implement and configured to detect a height of a windrow along a travel path at detection points, the windrow disposed below the windrow collecting implement and the first sensor disposed above the windrow;
   a second sensor carried by the windrow collecting implement and configured to detect a distance traveled by the windrow collecting implement; and,
   a processor configured to process the height of the windrow from the downward scanning first sensor, a length traveled by the windrow collecting implement from the second sensor, and the operating width to determine a volume of a material contained in the windrow, configured to process the volume of a material contained in the windrow to determine a yield map, wherein the yield map depicts continuous changes in volume of a windrow based on said detection points at regular intervals along the length traveled of the windrow collecting implement defining higher yielding and lower yielding areas throughout an entire field.

2. The yield monitoring system of claim 1, wherein the material is an agricultural crop.

3. The yield monitoring system of claim 1, including a third sensor configured to detect a width of the windrow.

4. The yield monitoring system of claim 1, including an additional sensor configured to detect a cross-sectional dimension of a windrow.

5. The yield monitoring system of claim 1, wherein the downward scanning first sensor is an ultrasonic sensor.

6. The yield monitoring system of claim 1 wherein the processor is configured to process a location data and the yield map to determine a yield per unit acre.

7. The yield monitoring system of claim 1 including a GPS carried by the windrow collecting implement providing location data of the windrow collecting implement.

8. The yield monitoring system of claim 7 wherein the processor is configured to process the location data provided by the GPS and the yield map to determine a yield per unit acre.

9. The yield monitoring system of claim 1, wherein the windrow collecting implement is a combine.

10. The yield monitoring system of claim 1, wherein the windrow collecting implement is a baler.

11. A yield monitoring system for determining an amount of material in a windrow comprising:
a windrow collecting implement configured to produce windrows
a controller carried by the windrow collecting implement;
a downward scanning first sensor in communications with the controller and configured to provide first sensor data;
a second sensor in communications with the controller and configured to provide second sensor data; and,
wherein the controller is configured to ascertain by use of a first sensor data regarding a cross-sectional area of a windrow disposed under the windrow collecting implement, ascertain by use of a second sensor data a distance traveled by the windrow collecting implement, process data from the first and second sensors to determine a volume of a material contained in the windrow; and, process the volume of a material contained in the windrow to determine a yield map, wherein the yield map depicts continuous changes in volume of a windrow based on said detection points at regular intervals along the length traveled of the windrow collecting implement defining higher yielding and lower yielding areas throughout an entire field.

12. The yield monitoring system of claim 11, wherein the first sensor data regarding the cross-sectional area includes a height of the windrow.

13. The yield monitoring system of claim 11, including processing the yield map to determine a yield per unit acre.

14. The yield monitoring system of claim 11, wherein the material comprises an agricultural crop.

15. The yield monitoring system of claim 14, wherein the agricultural crop comprises hay, straw, root crops, tuber crops, legumes, or small grains.

16. The yield monitoring system of claim 11, wherein the windrow collecting implement is a baler or a combine.

17. A yield monitoring system comprising:
a windrow collecting implement;
a downward scanning first sensor carried by the windrow collecting implement configured to detect a height of a windrow along a travel path wherein the first sensor is disposed above a windrow;
a second sensor carried by the windrow collecting implement configured to detect distance traveled by the windrow collecting implement; and,
a processor configured to determine a volume of a material contained in the windrow and process the volume of a material contained in the windrow to determine a yield map, wherein the yield map depicts continuous changes in volume of a windrow based on said detection points at regular intervals along the length traveled of the windrow collecting implement defining higher yielding and lower yielding areas throughout an entire field.

18. The yield monitoring system of claim 17 including a moisture sensor carried by the windrow collecting implement and wherein the processor is configured to determine a volume of a material contained in the windrow and process the volume of a material contained in the windrow and moisture data to determine a yield map.

19. The yield monitoring system of claim 17 wherein the processor is configured to process a location data and the yield map to determine a yield per unit acre.

20. The yield monitoring system of claim 17 including a GPS carried by the windrow collecting implement providing location data of the windrow collecting implement and wherein the processor is configured to process the location data provided by the GPS and the yield map to determine a yield per unit acre.

* * * * *